US008286548B2

(12) United States Patent
Krishnan et al.

(10) Patent No.: US 8,286,548 B2
(45) Date of Patent: Oct. 16, 2012

(54) COOKING APPLIANCE

(75) Inventors: Arvind G. Krishnan, Venetia, PA (US);
Christopher Matthew D'Eramo,
Eighty-Four, PA (US)

(73) Assignee: Soul of India, LLC, Venetia, PA (US)

( * ) Notice: Subject to any disclaimer, the term of this patent is extended or adjusted under 35 U.S.C. 154(b) by 1210 days.

(21) Appl. No.: 12/109,172

(22) Filed: Apr. 24, 2008

(65) Prior Publication Data
US 2008/0196595 A1 Aug. 21, 2008

Related U.S. Application Data

(63) Continuation-in-part of application No. 11/560,218, filed on Nov. 15, 2006.

(60) Provisional application No. 60/781,837, filed on Mar. 13, 2006.

(51) Int. Cl.
*A47J 37/06* (2006.01)
*H05B 3/06* (2006.01)

(52) U.S. Cl. .......................................... 99/378; 219/524

(58) Field of Classification Search ............ 99/372–384, 99/422–427; 219/443.1–468.2, 524, 532–541
See application file for complete search history.

(56) References Cited

U.S. PATENT DOCUMENTS

| D77,095 S | 12/1928 | Hurxthal |
| 2,057,501 A | 10/1936 | Parr |
| 2,105,815 A | 1/1938 | Lent |
| 2,571,373 A | 10/1951 | Massecar |
| 2,597,541 A | 5/1952 | Squires |
| 2,663,249 A | 12/1953 | Epstein |
| 2,732,580 A | 1/1956 | Schwaneke |
| 2,765,727 A | 10/1956 | Lipsich et al. |
| 2,830,529 A | 4/1958 | Jaffe |
| 2,881,299 A | 4/1959 | Jepson |
| 2,899,888 A * | 8/1959 | Koci ............................... 99/331 |
| 2,907,286 A | 10/1959 | Ruiz |
| 3,097,588 A | 7/1963 | De Jersey |
| 3,121,385 A | 2/1964 | Funke et al. |
| 3,215,062 A | 11/1965 | Frankenberg |
| 3,349,724 A | 10/1967 | Tavan |
| 3,373,893 A | 3/1968 | Dunkelis |
| 3,377,942 A | 4/1968 | Carbon |

(Continued)

FOREIGN PATENT DOCUMENTS
DE 2623294 A1 5/1976
(Continued)

OTHER PUBLICATIONS

"George Foreman GRB72P Platinum 72 Square Inch Platinum Grill," http://reviews.pricegrabber.com/small-kitchen-grills/m/26334832, Retrieved on Jan. 24, 2008.

(Continued)

*Primary Examiner* — Sang Paik
(74) *Attorney, Agent, or Firm* — K&L Gates LLP

(57) ABSTRACT

A cooking appliance is provided which includes a lower heating assembly and an upper heating assembly. The lower heating assembly includes a lower cooking surface, and the upper heating assembly includes an upper cooking surface. The upper cooking surface is translatable relative to the lower cooking surface in at least a substantially vertical manner, wherein the upper cooking surface and lower cooking surface remain substantially parallel to one another when the upper cooking surface translates relative to the lower cooking surface.

24 Claims, 28 Drawing Sheets

U.S. PATENT DOCUMENTS

| | | | |
|---|---|---|---|
| 3,559,565 | A | 12/1968 | Getz |
| 3,427,956 | A | 2/1969 | Jaffe |
| 3,611,912 | A | 7/1969 | Choc |
| 3,611,915 | A | 10/1969 | Glaser |
| 3,503,324 | A | 3/1970 | Gmeiner |
| 3,593,652 | A | 7/1971 | Lostanien |
| 3,630,140 | A | 12/1971 | Marrie |
| 3,682,348 | A | 8/1972 | Roberts |
| 3,714,937 | A | 2/1973 | Linstead |
| 3,799,047 | A * | 3/1974 | Freeman ............... 99/332 |
| 3,848,110 | A | 11/1974 | Giguere et al. |
| 3,852,569 | A | 12/1974 | Potvin |
| 3,938,431 | A | 2/1976 | Potvin |
| 3,999,473 | A | 12/1976 | Carbon |
| 4,170,933 | A | 10/1979 | Meamber |
| 4,280,402 | A | 7/1981 | Featherstone |
| 4,297,941 | A * | 11/1981 | Gallina ............... 99/332 |
| 4,321,858 | A | 3/1982 | Williams |
| 4,508,025 | A | 4/1985 | Schultz |
| 4,583,451 | A | 4/1986 | Kangay |
| 4,683,813 | A | 8/1987 | Schultz |
| 4,724,755 | A | 2/1988 | Escamilla |
| 4,809,450 | A | 3/1989 | Hochstasser et al. |
| 4,838,153 | A | 6/1989 | Escamilla et al. |
| 5,095,813 | A | 3/1992 | Escamilla et al. |
| 5,355,558 | A | 10/1994 | Vertanen |
| 5,363,748 | A | 11/1994 | Boehm et al. |
| 5,380,986 | A | 1/1995 | Mullen |
| 5,394,590 | A | 3/1995 | Yu |
| 5,429,110 | A | 7/1995 | Burke et al. |
| 5,481,963 | A | 1/1996 | Sesona et al. |
| 5,546,850 | A | 8/1996 | Zaveri |
| 5,570,625 | A | 11/1996 | Liebermann |
| 5,606,905 | A | 3/1997 | Boehm et al. |
| 5,617,840 | A | 4/1997 | Clifford |
| 5,630,358 | A | 5/1997 | Patel |
| 5,642,658 | A | 7/1997 | Liebermann |
| 5,694,834 | A | 12/1997 | Le Dall et al. |
| 5,701,804 | A | 12/1997 | Liebermann |
| 5,716,657 | A | 2/1998 | Liebermann |
| 5,800,844 | A | 9/1998 | Raio et al. |
| 5,934,182 | A | 8/1999 | Harter et al. |
| 5,996,476 | A | 12/1999 | Schultz |
| 6,016,741 | A | 1/2000 | Tsai et al. |
| 6,089,144 | A | 7/2000 | Garber et al. |
| 6,125,740 | A | 10/2000 | Hedrington et al. |
| 6,202,544 | B1 | 3/2001 | Martinez |
| D439,792 | S | 4/2001 | Hedrington et al. |
| 6,329,007 | B1 | 12/2001 | Khusro |
| 6,369,366 | B1 | 4/2002 | Mullen |
| 6,427,581 | B1 | 8/2002 | Wu |
| 6,443,054 | B1 | 9/2002 | McCarney |
| 6,549,818 | B1 | 4/2003 | Ali |
| 6,555,795 | B2 | 4/2003 | Glucksman et al. |
| 6,608,292 | B1 | 8/2003 | Barnes |
| 6,701,577 | B1 | 3/2004 | Yeh |
| 6,813,575 | B2 | 11/2004 | Laflamme |
| D500,629 | S | 1/2005 | Huggler et al. |
| 6,860,191 | B2 | 3/2005 | Jackson et al. |
| 6,889,602 | B2 | 5/2005 | Brady et al. |
| 6,967,036 | B1 | 11/2005 | Hedrington et al. |
| D522,802 | S | 6/2006 | Dreimann et al. |
| 7,064,298 | B2 * | 6/2006 | Li ............... 219/450.1 |
| D526,154 | S | 8/2006 | Dreimann et al. |
| 7,109,442 | B2 | 9/2006 | Steinberg et al. |
| D539,596 | S | 4/2007 | Dreimann et al. |
| D539,597 | S | 4/2007 | Dreimann et al. |
| D540,109 | S | 4/2007 | Dreimann et al. |
| 2005/0072311 | A1 | 4/2005 | Szymanski |
| 2005/0247210 | A1 | 11/2005 | Ragan |
| 2006/0213373 | A1 | 9/2006 | Fernandez et al. |
| 2007/0000393 | A1 | 1/2007 | Lam |
| 2007/0006740 | A1 | 1/2007 | Lam |
| 2007/0186758 | A1 | 8/2007 | Kim et al. |
| 2007/0221653 | A1 | 9/2007 | Krishnan |

FOREIGN PATENT DOCUMENTS

| | | |
|---|---|---|
| DE | 2929223 A1 | 7/1979 |
| WO | 2007051294 A1 | 5/2007 |

OTHER PUBLICATIONS

Brochure for Dosa Making Machine, SK Esskay Enterprises.
United Kingdom Search Report corresponding to United Kingdom Search Report No. UK0906830.5 dated Aug. 18, 2009.
Office Action for Application No. 11/560,218 mailed Jun. 12, 2009.
May 27, 2010 Examination Report Under Section 18(3) for Application No. GB0906830.5.
Mar. 9, 2010 Office Action for U.S. Appl. No. 11/560,218.
Office Action dated Jan. 14, 2009 for U.S. Appl. No. 11/560,218.
Office Action dated Jul. 9, 2008 for U.S. Appl. No. 11/560,218.

* cited by examiner

COOKING APPLIANCE

PRIORITY CLAIM

This application is a continuation-in-part of and claims priority to U.S. patent application Ser. No. 11/560,218, filed on Nov. 15, 2006, which claims the benefit of U.S. Provisional Patent Application Ser. No. 60/781,837, filed on Mar. 13, 2006.

SUMMARY

The present disclosure is directed to a cooking appliance, and more particularly to a cooking appliance for producing flatbreads or other foodstuffs.

In an embodiment, a cooking appliance is provided. The cooking appliance includes a first cooking surface and a second cooking surface. The second cooking surface is operatively connected to the first cooking surface. The first cooking surface is locatable in at least three operative positions relative to the second cooking surface.

In another embodiment, a cooking appliance is provided. The cooking appliance includes a first cooking surface and a second cooking surface. The second cooking surface is translatable in a substantially linear manner relative to the first cooking surface.

In another embodiment, a cooking appliance is provided. The cooking appliance includes a base and a lower heating assembly connected to the base. The lower heating assembly includes a substantially flat lower cooking surface. The cooking appliance further includes an upper heating assembly that is operatively connected to the lower heating assembly. The upper heating assembly includes an upper cooking surface, wherein the upper cooking surface has a spiral-shaped raised pattern.

In another embodiment, the cooking appliance includes a lower heating assembly and an upper heating assembly. The lower heating assembly includes a substantially flat lower cooking surface and both a resting aperture and a receiving aperture. The cooking appliance further includes an upper heating assembly that is operatively connected to the lower heating assembly. The upper heating assembly includes an upper cooking surface, wherein the upper cooking surface has a spiral-shaped raised pattern. The upper heating assembly further includes a guide post extending from the upper heating assembly. In this embodiment, the cooking appliance is configured such that when the cooking appliance is in a first operative position, the guide post rests in the resting aperture and when the cooking appliance is in a second operative position, the guide post extends into the receiving aperture. In this embodiment, the guide post ensures that the upper heating assembly moves in a substantially linear manner relative to the lower heating assembly. Or in other words, such that the upper heating assembly is substantially parallel to the lower heating assembly as it translates relative to the lower heating assembly. In one embodiment, the upper heating assembly and lower heating assembly include respective male and female stabilizing members. In another embodiment the lower heating assembly includes an overflow reservoir located radially outward from the lower cooking surface.

In other embodiments, a cooking appliance is provided which includes an upper and lower heating assembly, each including multiple respective upper and lower cooking surfaces. Such a cooking appliance enables the simultaneous cooking of multiple food items.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION

Figure 1:
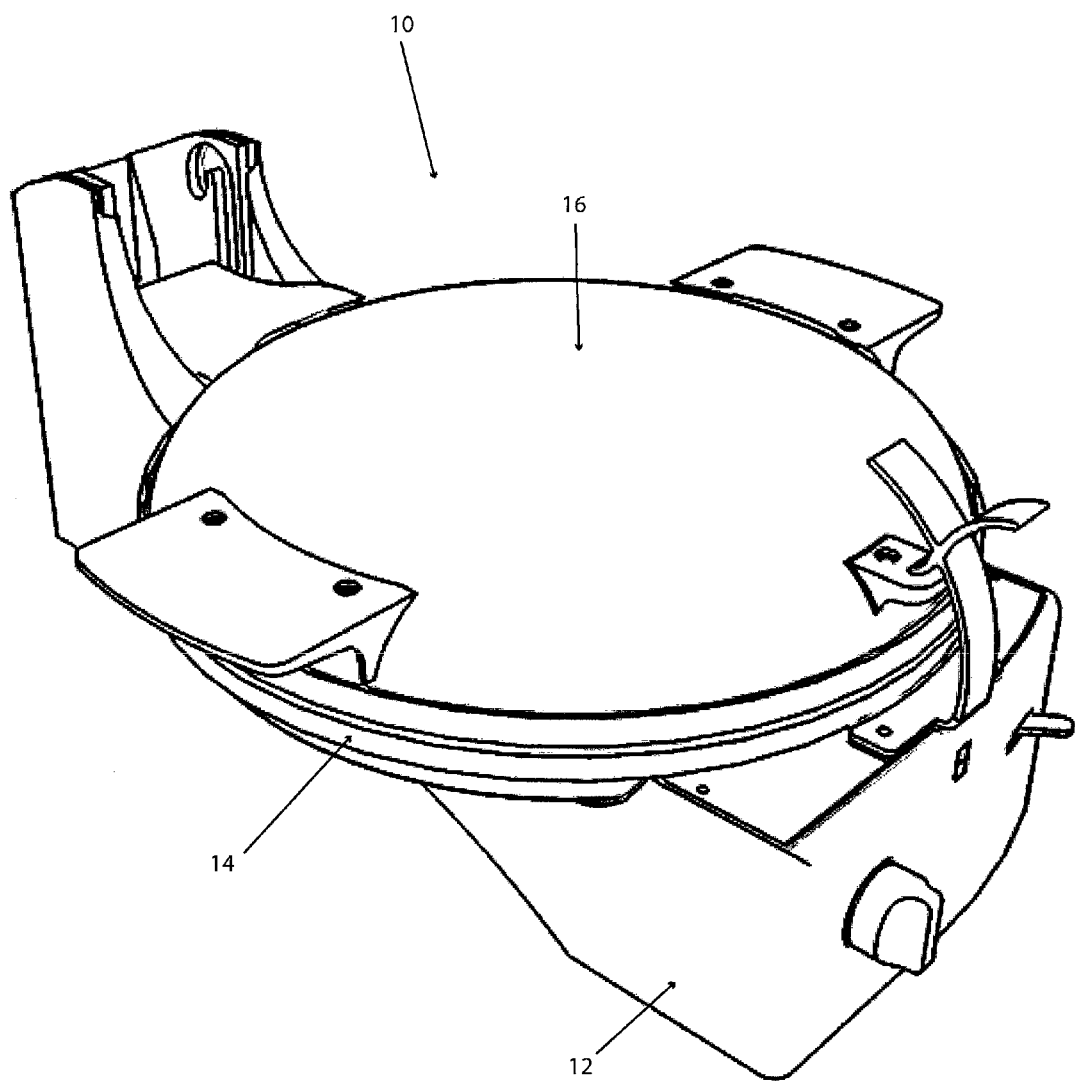
FIG. 1 is a top perspective view of an embodiment of a cooking appliance in accordance with the present disclosure.

Referring to FIG. 1, an embodiment of a cooking appliance 10 is shown. The cooking appliance 10 may be configured to produce any foodstuff including, but not limited to, flatbreads, tortillas, crepes, pitas, paninis, pancakes, naan, pizzelles, knaeckebrot, krumkakes, dosas, hamburgers, hotdogs, quesadillas, brats, or any other food. In the description below, it should be understood that the term "foodstuff" is used for ease of description in a broad sense and in a non-limiting way to include any foodstuff or food item that may be produced using either a single heated surface or a pair of opposing heated surfaces.

In an embodiment, a cooking appliance 10 includes a base 12, a lower heating assembly 14, and an upper heating assembly 16, as illustrated in FIG. 1. The base 12 provides a solid foundation for the cooking appliance 10, thereby allowing the cooking appliance 10 to be placed on a countertop, tabletop, or any other sufficiently flat and sturdy surface. The base 12 is adapted to provide structural support for the lower heating assembly 14 and the upper heating assembly 16. The base 12 may be formed of plastic, metal, metal in which at least a portion is overmolded with plastic, or any other material sufficient to support the lower and upper heating assemblies 14, 16 as well as provide heat insulation to prevent the user from being burned if the base 12 is touched during operation. In another embodiment, the base 12 may include rubber or plastic feet (not shown) extending downward from the bottom of the base 12, wherein the feet are adapted to provide a cushion between the base 12 and the surface upon which the cooking appliance 10 is located. The feet may also provide a frictional connection between the cooking appliance 10 and the surface against which the base 12 abuts in order to prevent the cooking appliance 10 from sliding relative to the surface. The feet may be formed of plastic, rubber, or any other material sufficient to provide a cushioned spacer and prevent the base 12 from sliding relative to the surface upon which the cooking appliance 10 is placed.

Figure 2:
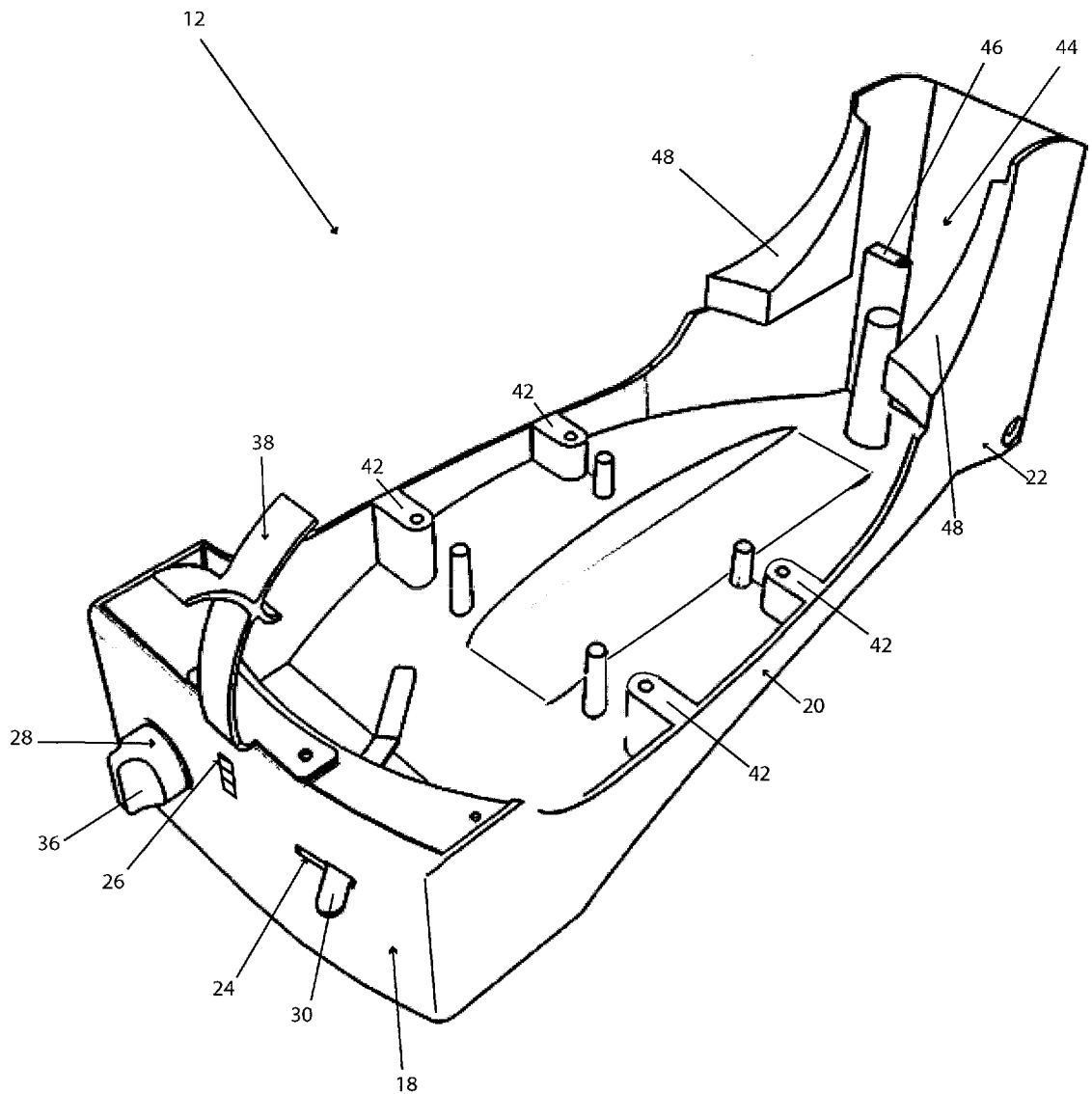
FIG. 2 is a top perspective view of an embodiment of a base.
Figure 3:
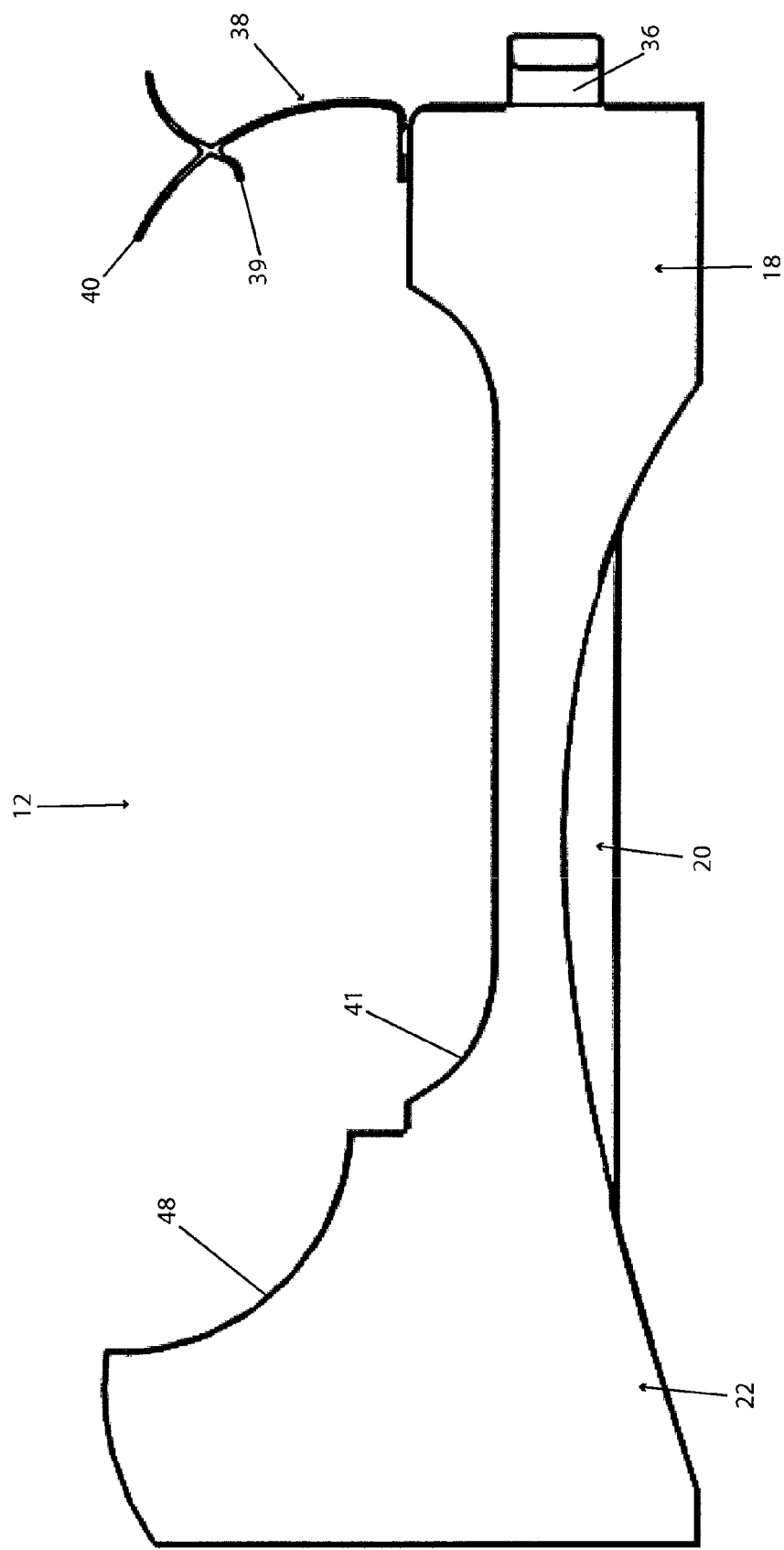
FIG. 3 is a side view of the base of FIG. 2.
Figure 4:
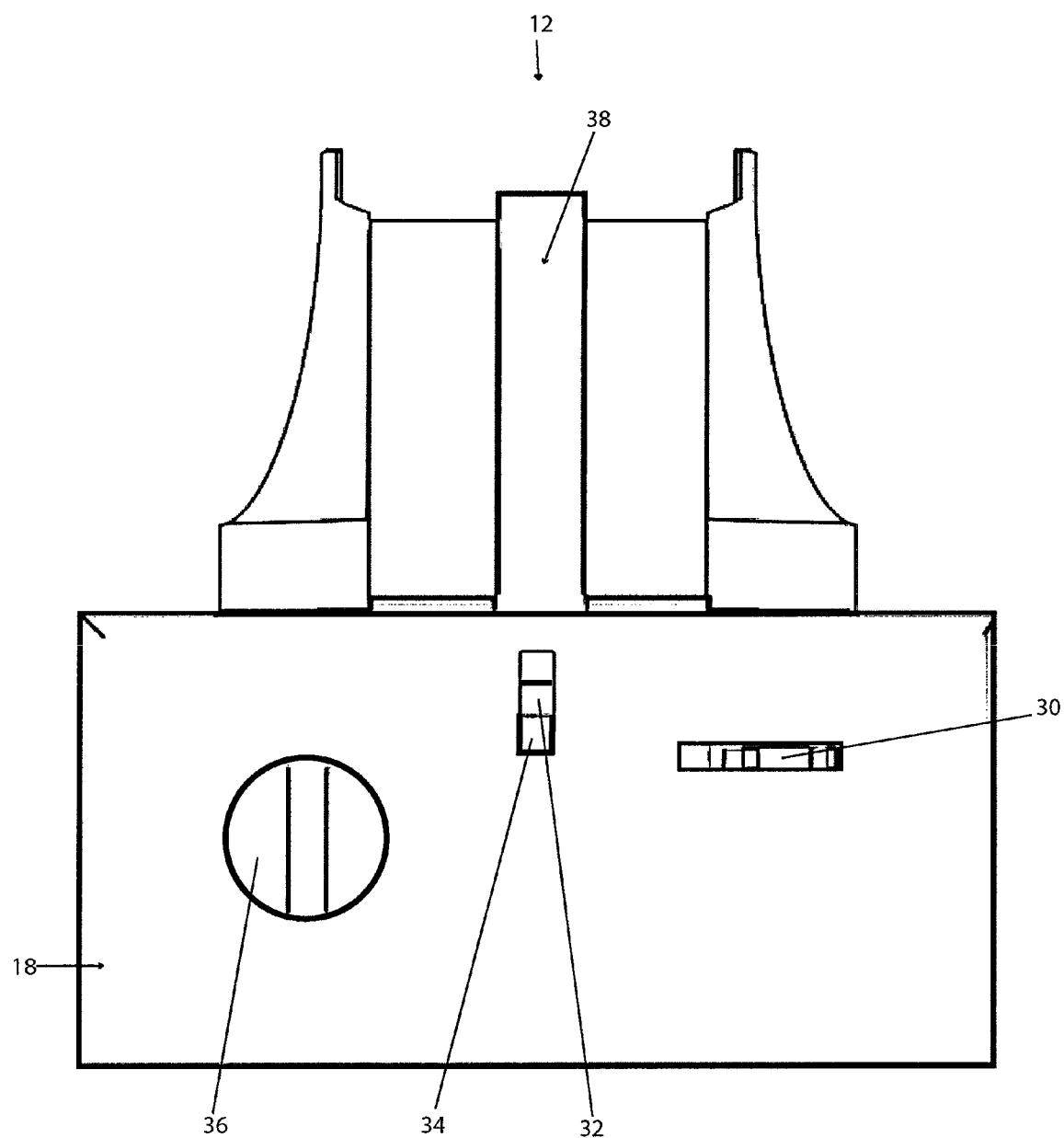
FIG. 4 is a front view of the base of FIG. 2.

In an embodiment, the base 12 is a generally elongated member, as shown in FIGS. 2-5, and includes a front portion 18, a central portion 20, and a rear portion 22. In use, the cooking appliance 10 is generally aligned such that the user faces the front portion 18 of the base 12. The front portion 18 includes controls and indicators, as illustrated in FIG. 4. The front portion 18 includes a temperature control 24, a temperature indicator 26, and a timer control 28. The temperature control 24 allows a user to selectively adjust the temperature of the lower heating assembly 14 and the upper heating assembly 16 either concurrently or individually. The temperature control 24 may allow the user to select an actual temperature or a relative temperature of the lower and upper heating assemblies 14, 16.

In an embodiment, the temperature control 24 includes a sliding mechanism 30 configured to allow the user to selectively increase or decrease the relative temperature of the lower and/or upper heating assemblies 14, 16 of the cooking appliance 10, as illustrated in FIG. 4. The sliding mechanism 30 has a range of movement that corresponds to the upper and lower adjustable temperature range of the lower and upper heating assemblies 14, 16. When the sliding mechanism 30 is placed at one limit, the heating assemblies 14, 16 are at the lowest selectable temperature limit. When the sliding mechanism 30 is at the opposite limit, the heating assemblies 14, 16 are at the highest selectable temperature limit. In an embodiment, a single sliding mechanism 30 concurrently controls the temperature of both the lower and upper heating assemblies 14, 16. In another embodiment, the front portion 18 may include a second sliding mechanism (not shown) such that one sliding mechanism is configured to selectively adjust the temperature of the upper heating assembly 16 and the other sliding mechanism is configured to selectively adjust the temperature of the lower heating assembly 14. The sliding mechanism 30 is configured to slide in a substantially horizontal manner, but it should be understood by one skilled in the art that the sliding mechanism 30 may be aligned to slide in a vertical manner or to rotate. The sliding mechanism 30 allows the user to selectively adjust the temperature of the lower and upper heating assemblies 14, 16 in which each position along the sliding mechanism corresponds to an actual temperature within an adjustable temperature range of the cooking appliance 10.

The temperature control 24 may also allow the user to selectively adjust the actual temperature of the lower and upper heating assemblies 14, 16. In an embodiment, the temperature control 24 is a rotatable knob (not shown) in which the knob includes indicia on the front portion 18 of the base 12 that correlates to the actual temperature of the heating assemblies 14, 16. In another embodiment, the temperature control 24 is a switch (not shown) having a plurality of selectable positions wherein each selectable position corresponds to an actual temperature of the heating assemblies 14, 16. In another embodiment, the temperature control 24 is a digital interface (not shown), wherein the user may select a specific temperature of the heating assemblies 14, 16. It should be understood by one skilled in the art that the temperature control 24 may be any mechanism sufficient to allow the user to selectively increase or decrease the actual or relative temperature of the lower and/or upper heating assemblies 14, 16. In another embodiment, the front portion 18 may also include a temperature display (not shown) that provides the actual measured temperature of the lower and upper heating assemblies 14, 16. Such a temperature display may be separate from, or integrated with, the temperature control 24.

The front portion 18 of the base 12 further includes a temperature indicator 26, as shown in FIG. 2. In an embodiment, the temperature indicator 26 includes a red LED 32 and a green LED 34, as shown in FIG. 4. The red LED 32 and the green LED 34 are connected to a temperature control circuit (not shown). The temperature control circuit receives a signal from the temperature control 24 indicating the temperature selected by the user and a signal representing the temperature of the lower and upper heating assemblies 14, 16. The temperature control circuit also includes a comparator that determines if the measured temperature of the lower and upper heating assemblies is above, below or equal to the temperature selected by the user. When the cooking appliance 10 is plugged into an outlet, the red LED 32 remains lit. If the measured temperature is equal to or above the temperature selected by the user, the temperature control circuit provides an output signal to illuminate the green LED 34 in addition to the red LED 32 which remains illuminated, thereby indicating that the cooking appliance 10 is heated to the selected temperature and ready for use.

In another embodiment, the temperature indicator 26 is a single LED that indicates when the lower and upper heating assemblies 14, 16 have reached the user-selected temperature. In an embodiment, the single LED may receive an output signal from the temperature control circuit to illuminate the single LED only when the measured temperature is below the temperature selected by the user. In the alternative, the single LED may receive an output signal from the temperature control circuit to illuminate the single LED only when the measured temperature is equal to or above the temperature selected by the user. In another embodiment, the temperature indicator 26 may produce an audible sound to indicate when the measured temperature is equal to the temperature selected by the user to indicate that the lower and upper heating assemblies 14, 16 have been sufficiently preheated. It should be understood by one skilled in the art that the temperature indicator 26 may provide visual or audible indicators either alone or in combination to indicate various temperatures, including but not limited to the temperature selected by the user, of the lower and upper heating assemblies 14, 16. It should be appreciated that although the above temperature indicators include LEDs, the indicators may include any type of light or illuminating device. Also, it should be appreciated that in other embodiments of the cooking appliance 10, the cooking appliance 10 does not include at least one of temperature controls and temperature indicators.

In an embodiment, the front portion 18 of the base 12 includes a timer control 28, as illustrated in FIG. 2. The timer control 28 may include a rotatable knob 36, as shown in FIG. 4, which provides a timer for the cooking appliance 10. The knob 36 is operatively connected to a bell (not shown), or other audible source, located on the rear surface of the front portion 18. The knob 36 is rotatable between a stop position and a timing position. The timer control 28 can be controlled by a knob or any other mechanical or electrical timing means known in the art. It should be appreciated that in other embodiments of the cooking appliance 10, the cooking appliance 10 does not include a timer.

The front portion 18 of the base 12 also includes a lower latch member 38 attached thereto, as shown in FIGS. 2 and 3. The lower latch member 38 includes a securing member 39 and a stabilizing member 40. The lower latch member 38 extends upwardly from the base 12. The lower latch member 38 is configured to engage the upper heating assembly 16, as will be discussed below.

The central portion 20 of the base 12 includes a recessed region 41 adapted to receive the lower heating assembly 14, as shown in FIG. 3. The recessed region 41 is formed as substantially the same shape as the bottom surface of the lower heating assembly 14 such that the lower heating assembly 14 can fit within the recessed region 41. The recessed region 41 also includes a plurality of bosses 42 (FIG. 2) that are adapted to allow the lower heating assembly 14 to be attached to the base 12.

The rear portion 22 of the base 12 includes a receiving region 44 adapted to receive the rear portions of the lower and upper heating assemblies 14, 16, as shown in FIG. 2. The receiving region 44 includes a pair of lugs 46 located on the inner surface of the receiving region 44. The lugs 46 are adapted to receive and support the hinge mechanism between the lower and upper heating assemblies 14, 16. The receiving region 44 further includes a pair of curved surfaces, or stop members 48, configured to selectively position the upper heating assembly 16 when in operation or otherwise. The rear portion 22 of the base 12 includes a substantially flat rear surface that allows the entire cooking appliance 10 to be stored in an upright position on the flat rear surface of the base 12.

Figure 5:
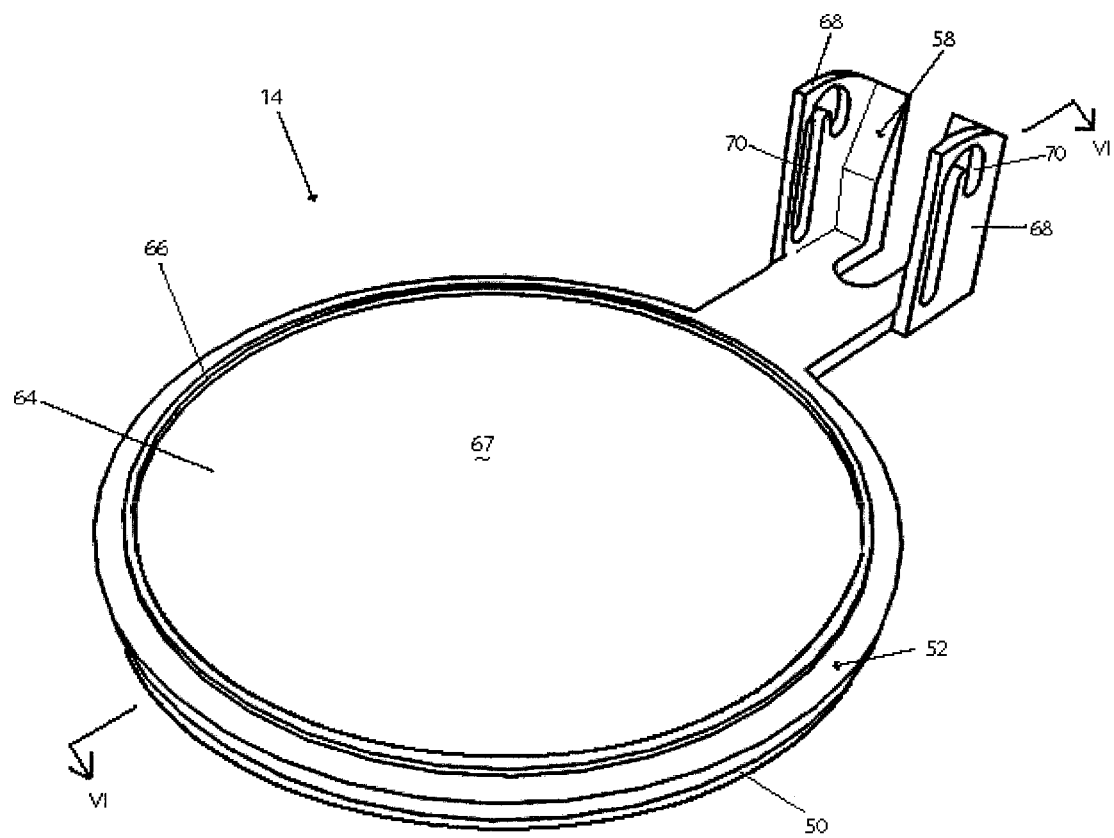
FIG. 5 is a top perspective view of an embodiment of a lower heating assembly.
Figure 6:
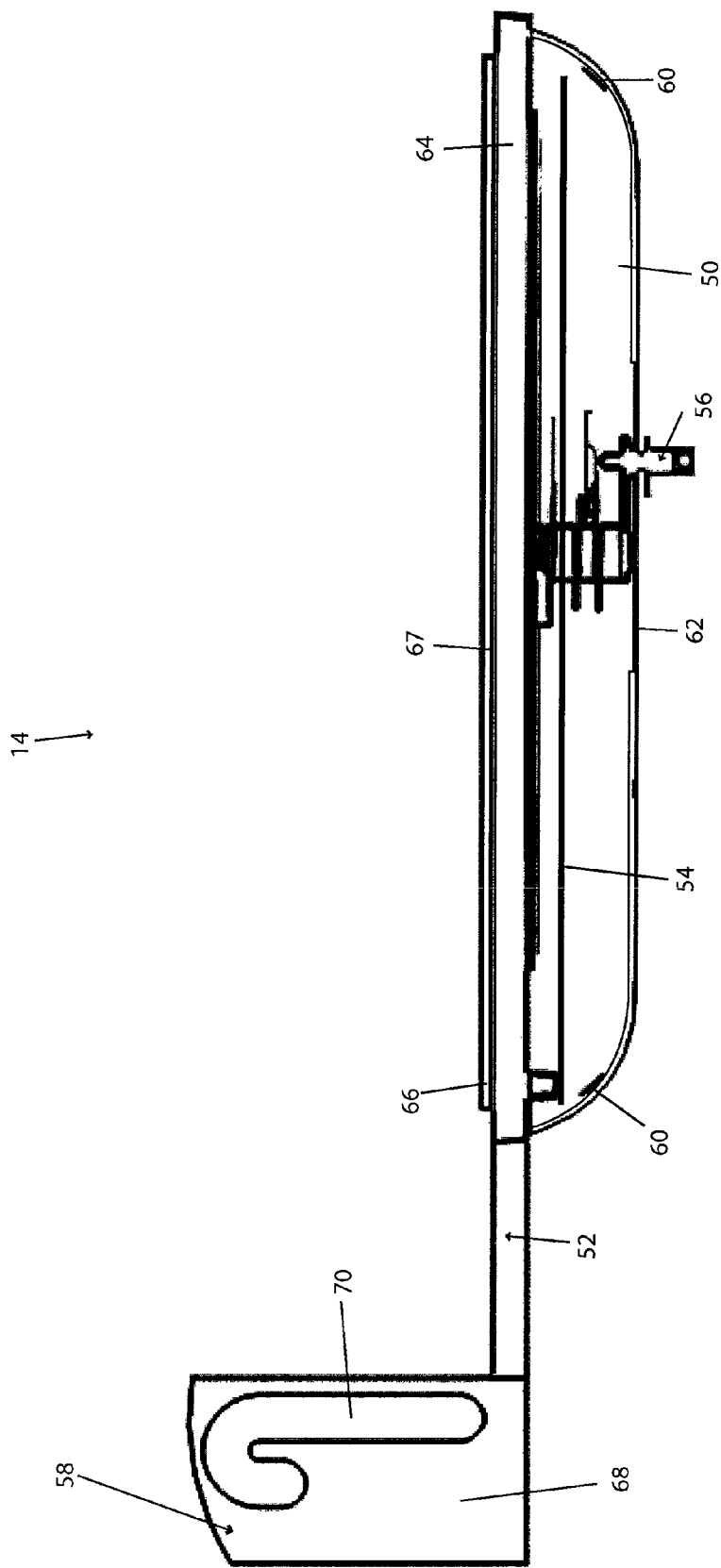
FIG. 6 is a cross-sectional view of the lower heating assembly along line VI-VI of FIG. 5.

Referring to FIGS. 5 and 6, the lower heating assembly 14 of the cooking appliance 10 is shown. In an embodiment, the lower heating assembly 14 includes a lower cover 50, lower heating member 52, lower insulator 54, lower thermostat assembly 56, and a hinge guide 58. The lower cover 50 is adapted to be received in the recessed region 41 of the base 12. The lower cover 50 may be formed of injection molded plastic, compression molded plastic, metal, ceramic, or any other material sufficient to provide protection to the lower heating member 52 of the lower heating assembly 14. In an embodiment, the lower cover 50 is formed of stainless steel. The lower cover 50 includes a plurality of apertures 60 formed therethrough. The apertures 60 formed in the upwardly-curved surfaces of the lower cover 50 are adapted to receive a connecting mechanism (not shown) for connecting the lower cover 50 to the lower heating member 52 and the lower insulator 54. The lower cover 50 includes a cut-out 62 that is adapted to receive the lower thermostat assembly 56 that extends upwardly from the lower cover 50 to the lower heating member 52. The lower cover 50 is formed as an upwardly-directed bowl-shaped member. In an embodiment, the lower cover 50 has a round shape, but it should be understood by one skilled in the art that the lower cover 50 can have any shape sufficient to be received in the recessed region 41. The shape of the lower cover 50 is sufficiently similar to the lower heating member 52 such that the lower cover 50 covers a substantial portion of the downwardly-directed surface of the lower heating member 52.

The lower heating assembly 14 includes a lower insulator 54 disposed between the lower cover 50 and the lower heating member 52, as illustrated in FIG. 6. A lower heating element (not shown) is disposed adjacent to the lower heating member 52 between the lower insulator 54 and the lower heating member 52. The lower heating element is controlled by the lower thermostat assembly 56. The lower insulator 54 may be formed of ceramic, fiberglass, mineral fabric, or non-asbestos insulation. In an embodiment, the lower insulator 54 is formed of glass reinforced plastic. It should be understood by one skilled in the art that the lower insulator 54 may be formed of any material sufficient to insulate the lower cover 50 from the lower heating member 52 to prevent the lower cover 50 from deforming as a result of the heat from the lower heating member 52. In an embodiment, the lower insulator 54 is located in a spaced-apart relationship relative to the bottom surface of the lower heating member 52 and the upper surface of the lower cover 50 to provide a gap therebetween. In an embodiment, the outer edge of the lower insulator 54 is spaced apart from the upwardly-directed surface of the lower cover 50. In another embodiment, the outer edge of the lower insulator 54 is in an abutting relationship with the upwardly-directed surface of the lower cover 50.

In an embodiment, the lower heating member 52 includes a lower cooking plate 64 and the hinge guide 58 that are formed as a unitary member, as illustrated in FIGS. 5 and 6. In another embodiment, the lower cooking plate 64 and the hinge guide 58 are formed as separate members that are thereafter connected to each other in a substantially rigid manner. In another embodiment, the lower cooking plate 64 and the hinge guide 58 are formed as separate members that are thereafter releasably connected to each other, thereby allowing the lower cooking plate 64 to be removed from the hinge guide 58 for disassembly. The lower heating assembly 14 is adapted to receive the lower thermostat assembly 56, and the lower thermostat assembly 56 is configured to control the cooking temperature of the lower cooking plate 64. In an embodiment, the lower cooking plate 64 is a substantially circular member with a radius of between about eight (8) inches to fourteen (14) inches (20.3 to 35.6 cm). It should be understood by one skilled in the art that the lower cooking plate 64 may be round, square, triangular, rectangular, oval, or any other shape sufficient to provide a heated cooking surface. The lower cooking plate 64 may be made of a substantially non-stick material, or the lower cooking plate 64 may include a non-stick surface added to its surface.

In an embodiment, the lower heating member 52 includes a raised edge 66 that is spaced radially inward from the outer edge of the lower cooking plate 64, as shown in FIGS. 5 and 6. The raised edge 66 extends upwardly from the upper surface of the lower cooking plate 64, and the raised edge 66 is adapted to be in an abutting relationship with the upper heating assembly 16 when the cooking appliance 10 is in an operative position, as will be discussed below. In one example, during operation, a batter or mixture used to form a foodstuff is poured or placed onto the lower cooking surface 67 within the volume enclosed by the raised edge 66. The raised edge 66 is configured to contain the batter therewithin to prevent spillage if the user pours too much batter onto the lower cooking plate 64. In an embodiment, the lower cooking plate 64 may include a detent, or channel (not shown), located radially outwardly from the raised edge 66 but radially inward from the outer edge of the cooking plate 64. The channel is adapted to receive excess batter not contained within the raised edge 66. The channel provides a secondary device for preventing excess batter from spilling out from the lower heating assembly 14. It should be appreciated that the reservoir is not limited to collecting overflowing batter, the reservoir may collect, grease or fat from a cooking meat, or any other foodstuff by-product or element.

In an embodiment, the lower cooking surface 67 enclosed within the raised edge 66 has a substantially flat pattern, as shown in FIG. 5. In another embodiment, the lower cooking surface 67 enclosed within the raised edge 66 may include an alternative pattern, to give a cooked food a patterned bottom surface. For example, the patterned lower cooking surface 67 may be flat for tortillas, or have substantially parallel patterns for paninis, rounded and raised projections for knaeckebrot, or an ornate design for pizzelles and krumkakes. In an embodiment, the lower heating member 52 is removable and interchangeable such that the user may remove or replace the lower heating member 52 having a flat lower cooking surface 67 with a lower heating member 52 having a different patterned lower cooking surface 67. In another embodiment, the lower cooking plate 64 is releasably connected to the hinge guide 58 so the lower cooking plate 64 can be removed and replaced with another lower cooking plate 64 having a different pattern on the lower cooking surface 67. Additionally, the lower heating member 52 having a flat lower cooking surface 67 with a raised edge 66 of a first height may be removed and replaced with a raised edge 66 having a second height, wherein the second height of the raised edge 66 may be greater than or less than the first height of the raised edge 66. The lower heating member 52 with the raised edge 66 having the first height produces a foodstuff with a first thickness, and the lower heating member 52 with the raised edge 66 having the second height produces a foodstuff with a thickness different than the first thickness. The user may replace the lower heating member 52 to selectively adjust the thickness or the pattern of the foodstuff produced between the lower and upper heating members 52, 74.

In an embodiment, the lower heating member 52 includes a hinge guide 58 integrally formed therewith, as illustrated in FIGS. 5 and 6. The hinge guide 58 extends from the lower cooking plate 64. In an embodiment, the hinge guide 58 includes a pair of opposing support members 68, and each support member 68 has a track 70 formed through the thickness. The opposing tracks 70 are configured to receive a hinge pin connected to the upper heating assembly 16. The support members 68 are received in the receiving region 44 of the base 12. The support members 68 are disposed atop the lugs 46 (FIG. 2) of the base 12, and the lower heating member 52 receives a plurality of connecting mechanisms that secure the lower heating member 52 to the base 12.

In an embodiment, the track 70 formed through each support member 68 forms the shape of a shepherd's staff, or an inverted J-shape, as shown in FIGS. 5 and 6. The track 70 includes a substantially linear portion and an arced portion extending from the substantially linear portion. The arced portion has a substantially semicircular shape. The substantially linear portion extends in a substantially perpendicular manner relative to the cooking surface of the lower cooking plate 64. In an embodiment, the tracks 70 are formed through the thickness of the support members 68, thereby allowing the upper heating assembly 16 to be easily removed from the lower heating assembly 14. In another embodiment, the tracks 70 are formed through a portion of the thickness of the opposing support members 68. The tracks 70 are configured to allow the upper heating assembly 16 to rotate, translate, or a combination of rotation and translation relative to the lower heating assembly 14.

Figure 6A:
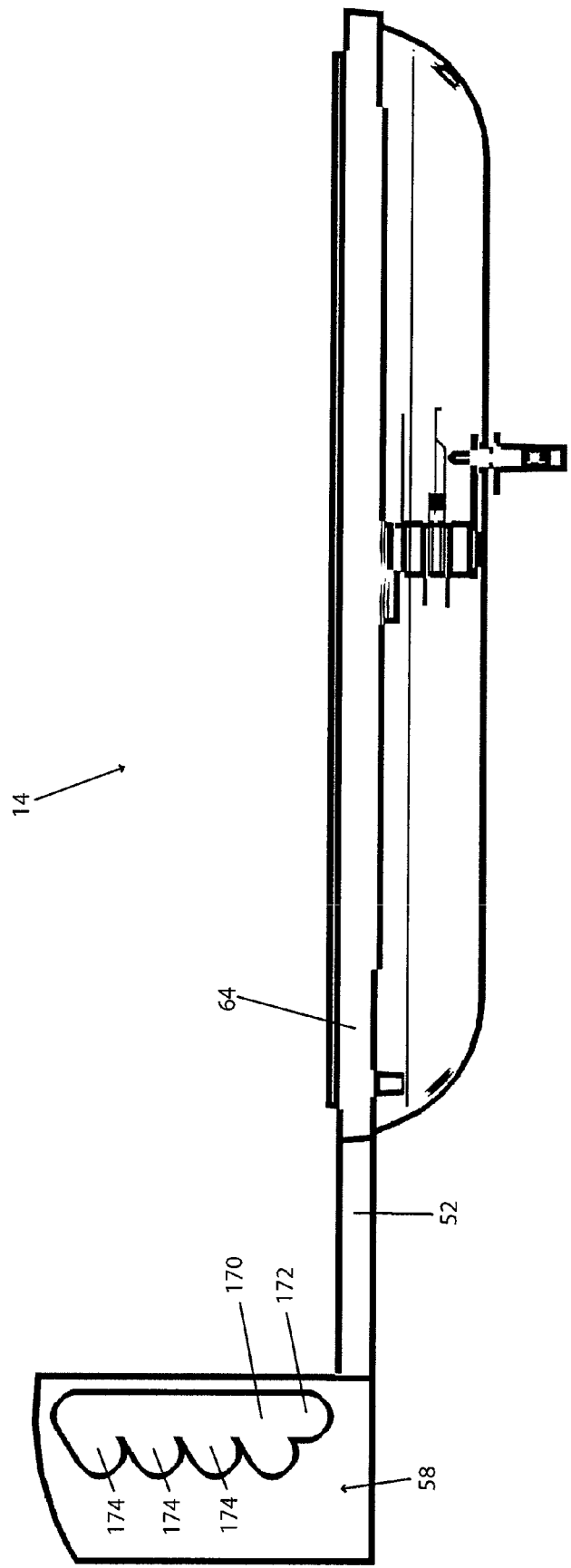
FIG. 6A is a cross-sectional view of another embodiment of a lower heating assembly.

In another embodiment, the hinge guide 58 includes a pair of opposing tracks 170, as shown in FIG. 6A. The tracks 170 include a substantially linear portion 172 extending in a substantially normal manner with respect to the lower cooking plate 64. A plurality of notches 174 extend from the linear portion 172 of the tracks 170. The notches 174 are adapted to receive the hinge pin 102 of the upper heating assembly 16 to selectively locate and secure the upper heating assembly 16 in a plurality of operative positions. The notches 174 may extend rearward from the linear portion 172 at an angle. In another embodiment, the notches 174 may extend rearwardly from the linear portion 172 of the tracks 170 in a substantially parallel manner. It should be understood by one skilled in the art that the notches 174 may extend from the linear portion 172 of the tracks 170 forwardly, rearwardly, or a combination thereof in an alternating or random manner. In another embodiment, the notches 174 may be oriented in a spaced-apart manner.

Figure 7:
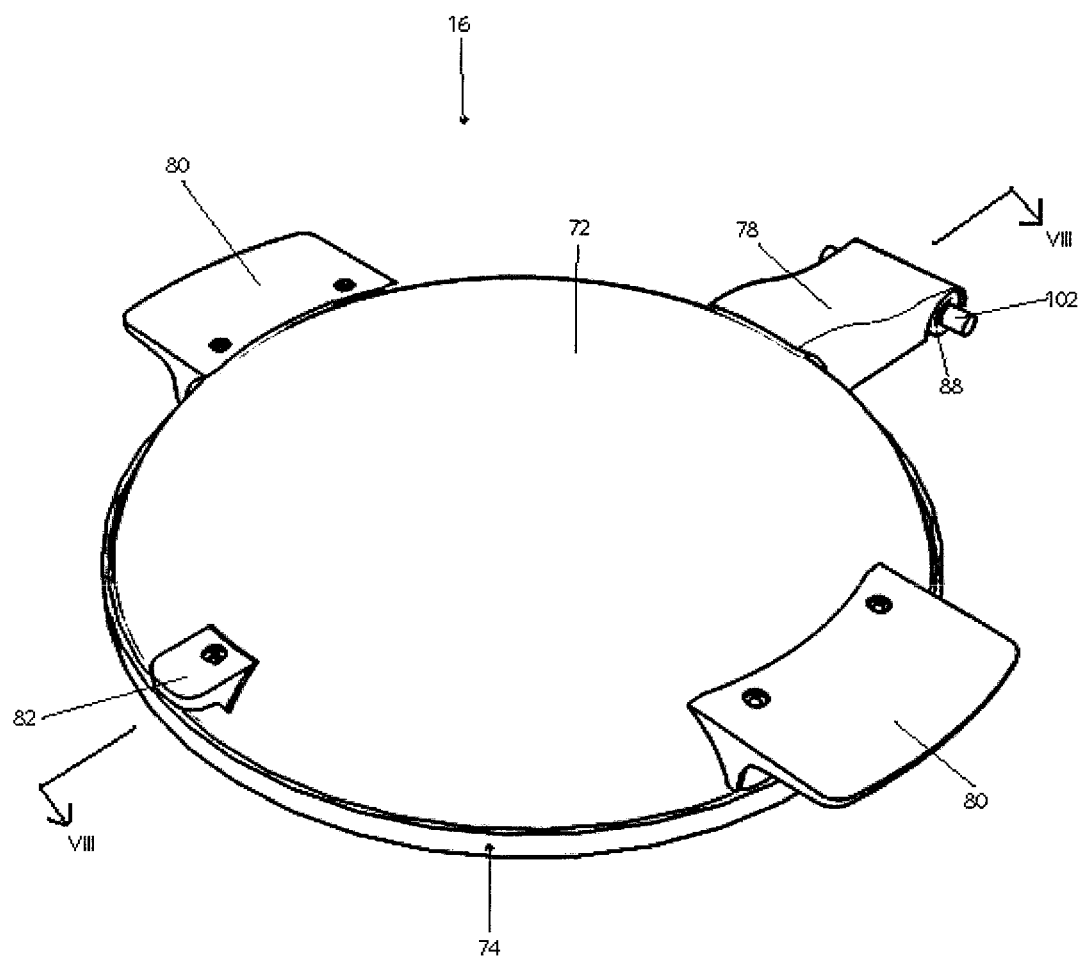
FIG. 7 is a top perspective view of an embodiment of an upper heating assembly.
Figure 8:
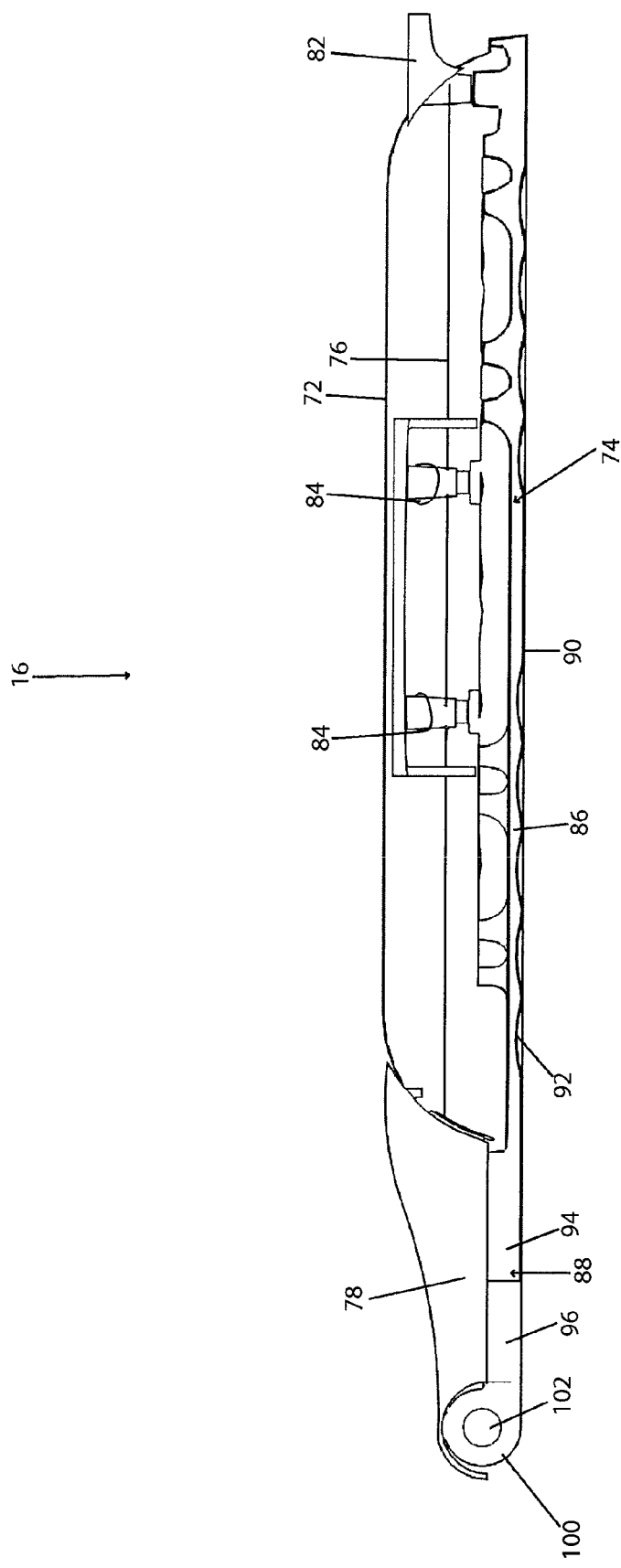
FIG. 8 is a cross-sectional view of the upper heating assembly along line VIII-VIII of FIG. 7.
Figure 9:
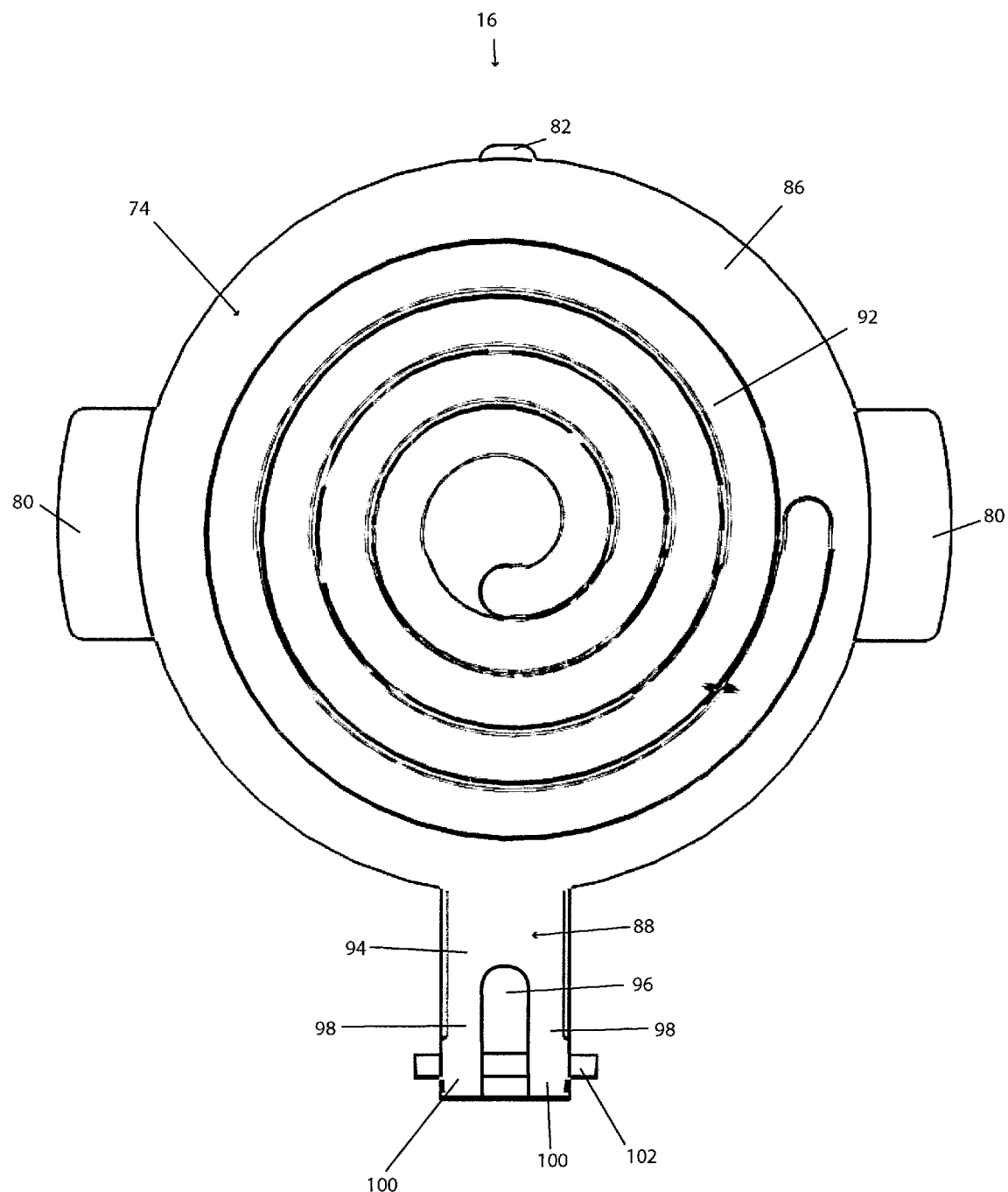
FIG. 9 is a bottom view of the upper heating assembly of FIG. 7.

Referring to FIGS. 7 to 9, an embodiment of the upper heating assembly 16 is shown. In an embodiment, the upper heating assembly 16 includes an upper cover 72, upper heating member 74, upper insulator 76, hinge cover 78, a pair of handles 80, and an upper latch member 82. The upper cover 72 may be formed of injection molded plastic, compression molded plastic, metal, ceramic, or any other material sufficient to provide protection to the upper heating member 74 of the upper heating assembly 16. In an embodiment, the upper cover 72 is formed of stainless steel. The upper cover 72 may be formed from the same mold or stamping as the lower cover 50 such that the lower and upper heating assemblies 14, 16 have a similar shape, or in the alternative, the upper cover 72 may be formed differently than the lower cover 50. The upper cover 72 includes a plurality of apertures 84 formed therethrough. The apertures 84 are adapted to receive a connecting mechanism (not shown) for connecting the handles 80, the upper heating member 74, and the upper insulator 76 to the upper cover 72. The upper cover 72 is formed as a downwardly-directed bowl-shaped member. In an embodiment, the upper cover 72 has a substantially round shape, but it should be understood by one skilled in the art that the upper cover 72 may have any shape similar to the shape of the lower cover 50. The shape of the upper cover 72 is sufficiently similar to the upper heating member 74 such that the upper cover 72 covers a substantial portion of the upwardly-directed surface of the upper heating member 74.

In an embodiment, the upper heating assembly 16 includes a pair of opposing handles 80 attached to the upper cover 72, as illustrated in FIG. 7. The handles 80 extend laterally from opposing sides of the cover 72. The handles 80 allow the user to lift the upper heating assembly 16 relative to the lower heating assembly 14. The upper heating assembly 16 also includes an upper latch member 82 attached to the upper cover 72, as shown in FIG. 7. The upper latch member 82 is configured to engage to the lower latch member 38 connected to the base 12 to secure the upper heating assembly 16 when the cooking appliance 10 is in an operative position.

In an embodiment, the upper heating assembly 16 includes an upper insulator 76 disposed between the upper cover 72 and the upper heating member 74, as illustrated in FIG. 8. The upper insulator 76 may be formed of ceramic, fiberglass, mineral fabric, or non-asbestos insulation. In an embodiment, the upper insulator 76 is formed of glass reinforced plastic. It should be understood by one skilled in the art that the upper insulator 76 may be formed of any material sufficient to insulate the upper cover 72 from the upper heating member 74 to prevent the upper cover 72 from deforming as a result of the heat from the upper heating member 74. In an embodiment, the upper insulator 76 is located in a spaced-apart relationship relative to the top surface of the upper heating member 74 and the bottom surface of the upper cover 72 to provide a gap therebetween. An upper heating element (not shown) is located adjacent to the upper heating member 74 between the upper insulator 76 and the upper heating member 74. In an embodiment, the upper heating element is controlled by an upper thermostat assembly (not shown). In another embodiment, the temperature of the upper heating element is controlled by the lower thermostat assembly 56. In an embodiment, the outer edge of the upper insulator 76 is spaced apart from the downwardly-directed surface of the upper cover 72. In another embodiment, the outer edge of the upper insulator 76 is in an abutting relationship with the downwardly-directed surface of the upper cover 72.

In an embodiment, the upper heating member 74 includes an upper cooking plate 86 and a hinge member 88 formed together as a unitary member, as illustrated in FIGS. 7 to 9. In another embodiment, the upper cooking plate 86 and the hinge member 88 are formed as separate members and thereafter connected to each other in a substantially rigid manner. In yet another embodiment, the upper heating member 74 includes an upper cooking plate 86 releasably connected to the hinge member 88. In an embodiment, the upper cooking plate 86 is a substantially circular member with a radius of between about eight (8) inches to fourteen (14) inches (20.3-35.6 cm). In an embodiment, the upper cooking plate 86 is generally the same size and shape as the opposing lower cooking plate 64. It should be understood by one skilled in the art that the upper cooking plate 86 may be round, square, triangular, rectangular, oval, or any other shape sufficient to provide a heated cooking surface. In an embodiment, the lower thermostat assembly 56 controls the temperature of the lower and upper cooking surfaces 67, 90. In another embodiment, the temperature of the lower cooking surface 67 is controlled by the lower thermostat assembly 56 and the temperature of the upper cooking surface 90 is controlled by an upper thermostat assembly (not shown). The upper cooking plate 86 may be made of a substantially non-stick material, or the upper cooking plate 86 may include a non-stick surface added to its surface.

In an embodiment, the upper heating member 74 includes a detent, or channel (not shown), spaced radially inwardly from the outer edge of the upper cooking plate 86. The channel extends inwardly from the upper cooking surface 90 of the upper cooking plate 86, and the channel is adapted to receive the corresponding raised edge 66 of the lower heating member 52. In another embodiment, the upper heating member 74 includes a substantially flat surface such that when the lower and upper heating members 52, 74 are in an abutting relationship, the raised edge 66 of the lower heating member 52 is abutting the flat surface of the upper heating member 74. In yet another embodiment, the upper heating member 74 includes a corresponding raised edge (not shown) that extends downwardly from the upper cooking surface 90 such that the raised edges of the lower and upper cooking members 52, 74 are in an abutting relationship when the upper heating member 74 is lowered to a position adjacent to the lower heating member 52.

Figure 23:
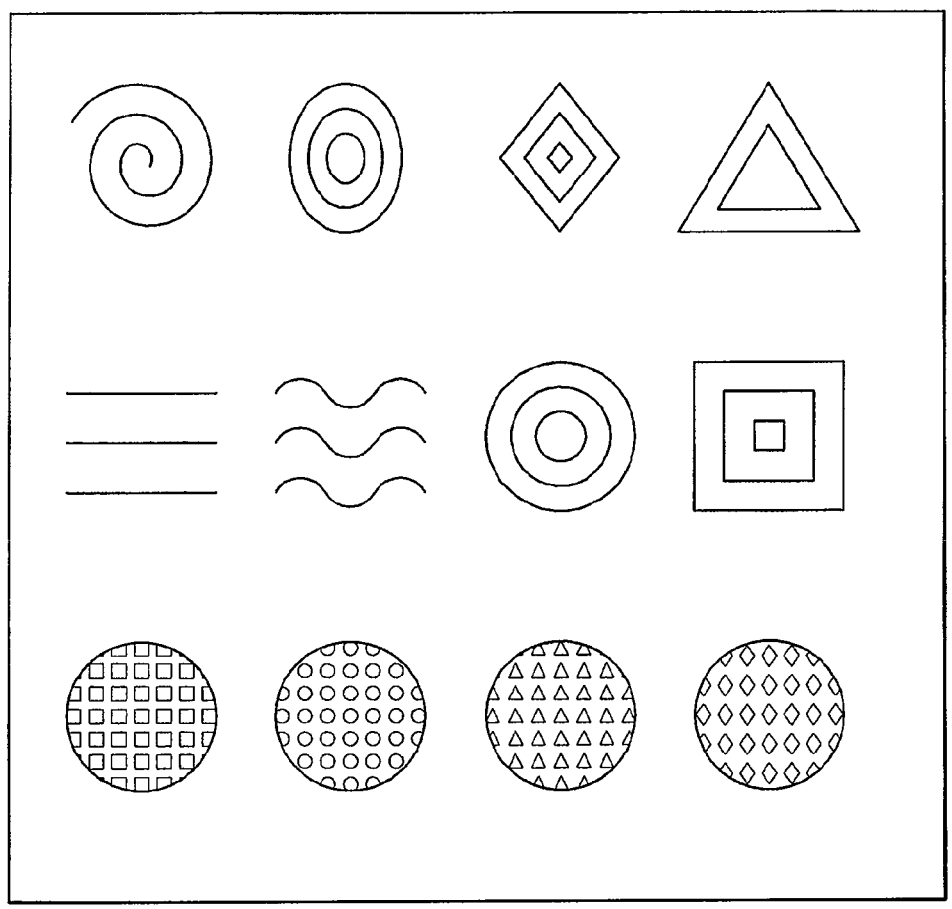
FIG. 23 is an illustration of a variety of possible elements which may be included in a pattern on an upper or lower cooking plate.

In an embodiment, the upper cooking surface 90 includes a raised pattern 92 having a spiral shape, as shown in FIG. 9. The spiral-shaped raised pattern 92 could for example, simulate the swirl formation from a ladle. In another example, the cooking appliance 10 is used to cook foodstuffs such as a tortilla, pita, crepe, pancake, and the like, typically have a flat upper surface. In making these foodstuffs, the pattern of both the lower and upper cooking surfaces 67, 90 could be flat in order to produce a foodstuff having a flat upper surface. In one example, batter or dough is placed on the lower cooking surface 67, the upper heating assembly 16 is closed such that the upper cooking surface 90 presses the batter or dough out to fill the volume within the raised edge 66 on the lower cooking surface 67, and the lower and upper cooking surfaces 67, 90 produce a foodstuff having flat top and bottom surfaces. In other applications, the cooking appliance 10 may also be used to cook a panini, pizzelle, krumkake, knaeckebrot, or other foodstuff having a patterned top and/or bottom surface in which the top surface, bottom surface, or both top and bottom surfaces have a pattern that is not substantially flat. For example, the patterned lower and upper cooking surface 67, 90 may include substantially parallel patterns for paninis, rounded and raised projections for knaeckebrot, an ornate design for pizzelles and krumkakes, or any pattern in any shape. It should be appreciated that the cooking appliance 10 may be utilized to cook any foodstuff or type food with any shape or pattern on one or both of the top and bottom surface of the foodstuff. Patterns for one or both of the upper and lower cooking assemblies could include features, including but not limited to: (a) straight lines; (b) curved lines; (c) concentric circles; (d) overlapping circles; (e) concentric squares; (f) overlapping squares; (g) concentric ovals; (h) overlapping ovals; (i) concentric diamonds; (j) overlapping diamonds; (k) concentric polygons; (l) overlapping polygons; (m) a spiral shape; (n) circles; (o) squares; (p) ovals; (q) diamonds; and (r) polygons. Examples of such pattern elements are illustrated in FIG. 23.

In an embodiment, the lower and upper cooking surfaces 67, 90 have the same pattern. In another embodiment, the lower and upper cooking surfaces 67, 90 have different patterns. In an embodiment, the upper heating member 74 is removable and interchangeable such that the user may remove or replace the upper heating member 74. In another embodiment, the upper cooking plate 86 is releasably connected to the hinge member 88 such that the upper cooking plate 86 can be removed and replaced with another upper cooking plate 86 having a different pattern on the upper cooking surface 90. The removable lower and upper heating members 52, 74 allow the user to use the cooking appliance 10 for a variety of different applications to produce different types of foodstuffs corresponding to the different lower and upper heating members 52, 74.

In an embodiment, the upper heating assembly 16 includes a hinge member 88 that extends from the upper cooking plate 86, as shown in FIGS. 7 to 9. A hinge cover 78 is disposed adjacent to the hinge member 88 in order to protect the hinge member 88 during operation. The hinge member 88 includes an elongated bridge 94 extending rearward from the upper cooking plate 86 in a substantially lateral manner. The bridge 94 has a U-shaped cut-out 96 extending from the distal end of the bridge 94 toward the upper cooking plate 86. The U-shaped cut-out 96 forms a pair of opposing legs 98. A substantially cylindrical boss 100 is formed at the distal end of each leg 98 of the bridge 94. The cylindrical bosses 100 are configured to receive a hinge pin 102 that extends between and beyond each of the cylindrical bosses 100. The hinge pin 102 is received by the opposing tracks 70 of the hinge guide 58, thereby operatively connecting the upper heating assembly 16 to the lower heating assembly 14 and allowing the upper heating assembly 16 to be selectively adjusted relative to the lower heating assembly 14. In an embodiment, the hinge pin 102 is a solid cylindrical rod that extends between the opposing tracks 70 such that the opposing distal ends of the hinge pin 102 are maintained within the hinge guide 58 by the receiving region 44 of the base 12 when each track 70 is formed through the thickness of the corresponding support member 68. In another embodiment, the hinge pin 102 is a two-piece telescoping rod (not shown) having a spring located within the opposing two pieces, thereby biasing each of the telescoping rods outwardly to contact the opposing tracks 70 when each track 70 is formed through only a portion of the thickness of the corresponding support member 68. In another embodiment, the hinge pin 102 is a solid elongated member having a square cross-section. It should be understood by one skilled in the art that the hinge pin 102 can have any cross-sectional shape sufficient to allow the hinge pin 102 to travel between the limits of the opposing tracks 70. In an embodiment, the hinge member 88 and the upper cooking plate 86 are formed as a unitary member. In another embodiment, the hinge member 88 and the upper cooking plate 86 are formed as different members that are then attachable in a substantially rigid manner. In yet another embodiment, the hinge member 88 and the upper cooking plate 86 are formed as different members that are then releasably connected to each other.

The hinge pin 102 is removable from the tracks 70, thereby allowing the upper heating assembly 16 to be removably attachable to the lower heating assembly 14. The hinge pin 102 is also configured to translate along the tracks 70 formed in the hinge guide 58 of the lower heating assembly 14. The hinge pin 102 allows the upper heating assembly 16 to translate in a substantially vertical manner relative to the lower heating assembly 14, wherein the upper cooking surface 90 may be maintained in a substantially parallel relationship relative to the lower cooking surface 67. The hinge pin 102 also allows the upper heating assembly 16 to rotate about the axis formed by the hinge pin 102 relative to the lower heating assembly 14, wherein the upper cooking surface 90 may be located in an angled position relative to the lower cooking surface 67.

In an embodiment, the cooking appliance 10 may be disassembled for ease of cleaning or repair. The upper heating assembly 16 may be detached from the lower heating assembly 14 by removing the hinge pin 102 from the hinge guide 58. The lower heating assembly 14 may then be removed from the base 12 by releasing the fastening mechanisms connecting the lower heating assembly 14 to the base 12. The lower and upper heating assemblies 14, 16 may further be disassembled. The lower and upper heating members 52, 74 may be separated from the lower and upper covers 50, 72, respectively. The lower and upper insulators 54, 76 may then be separated from the lower and upper covers 50, 72, respectively. Finally, the lower thermostat assembly 56 may then be detached from the upper and lower heating members 52, 74.

The upper and lower heating members 52, 74 may be removable for repair, replacement, or for reconfiguring the cooking appliance 10 by replacing the respective heating member with another heating member having a different pattern formed on the cooking surface thereof. The lower and upper heating members 52, 74 may be removed for ease of cleaning. The lower cover 50, lower heating member 52, upper cover 72, upper heating member 74, and base 12 may be formed of a dishwasher safe material that allows each of these members to be disconnected from the lower thermostat assembly 56 and other electronic wiring to be placed individually into a dishwasher or cleaned by hand.

In operation, the cooking appliance 10 includes a plurality of operative positions in which the upper heating assembly 16 may be selectively located at a different position or orientation relative to the lower heating assembly 14. Each of the operative positions provides the cooking appliance 10 with operational advantages, thereby allowing a user to cook a variety of different foodstuffs or allowing the user to manipulate the foodstuff being cooked by selectively relocating the upper heating assembly 16 between the operative positions.

Figure 10A:
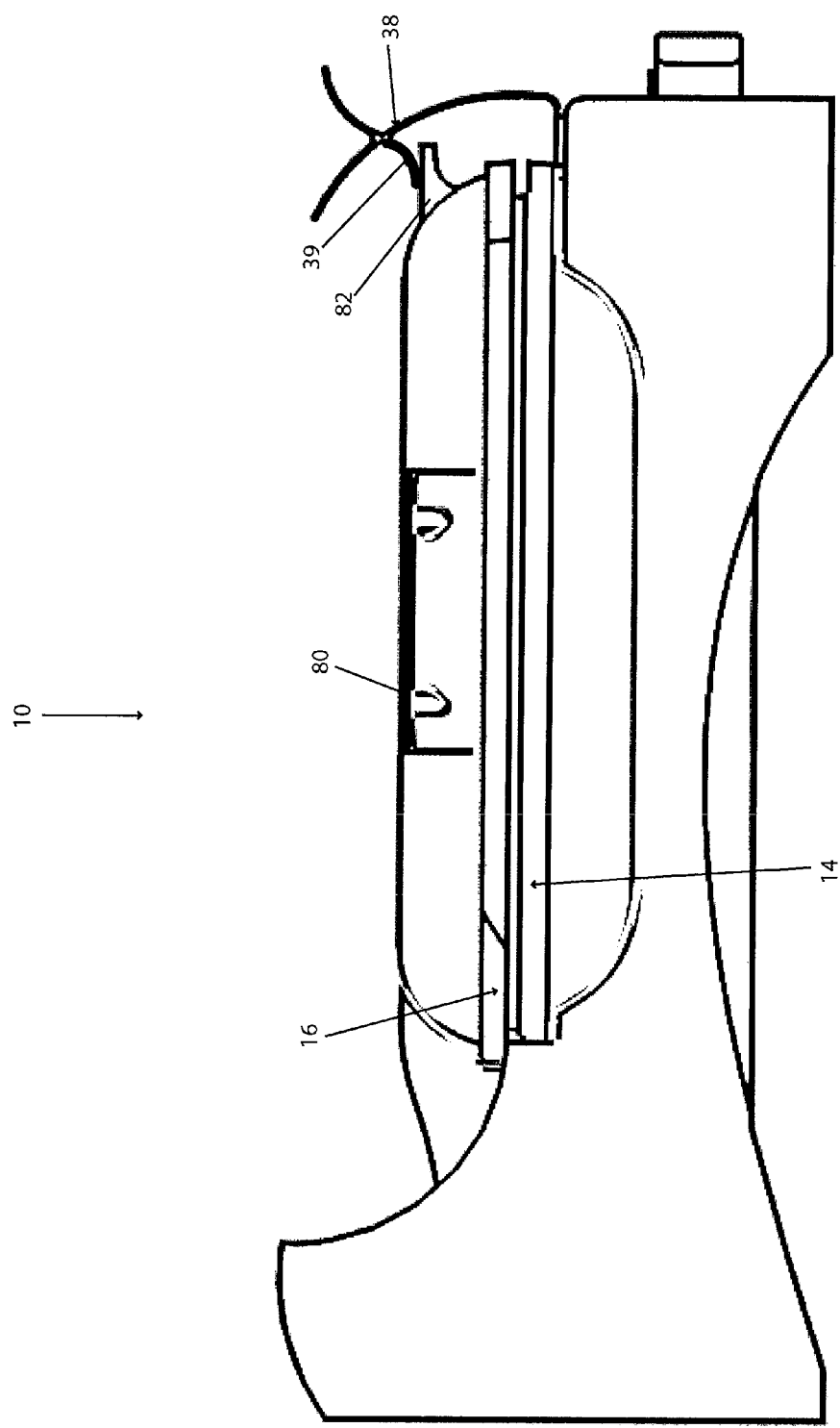
FIG. 10A is a side view of an embodiment of a cooking appliance in a first operative position.
Figure 10B:
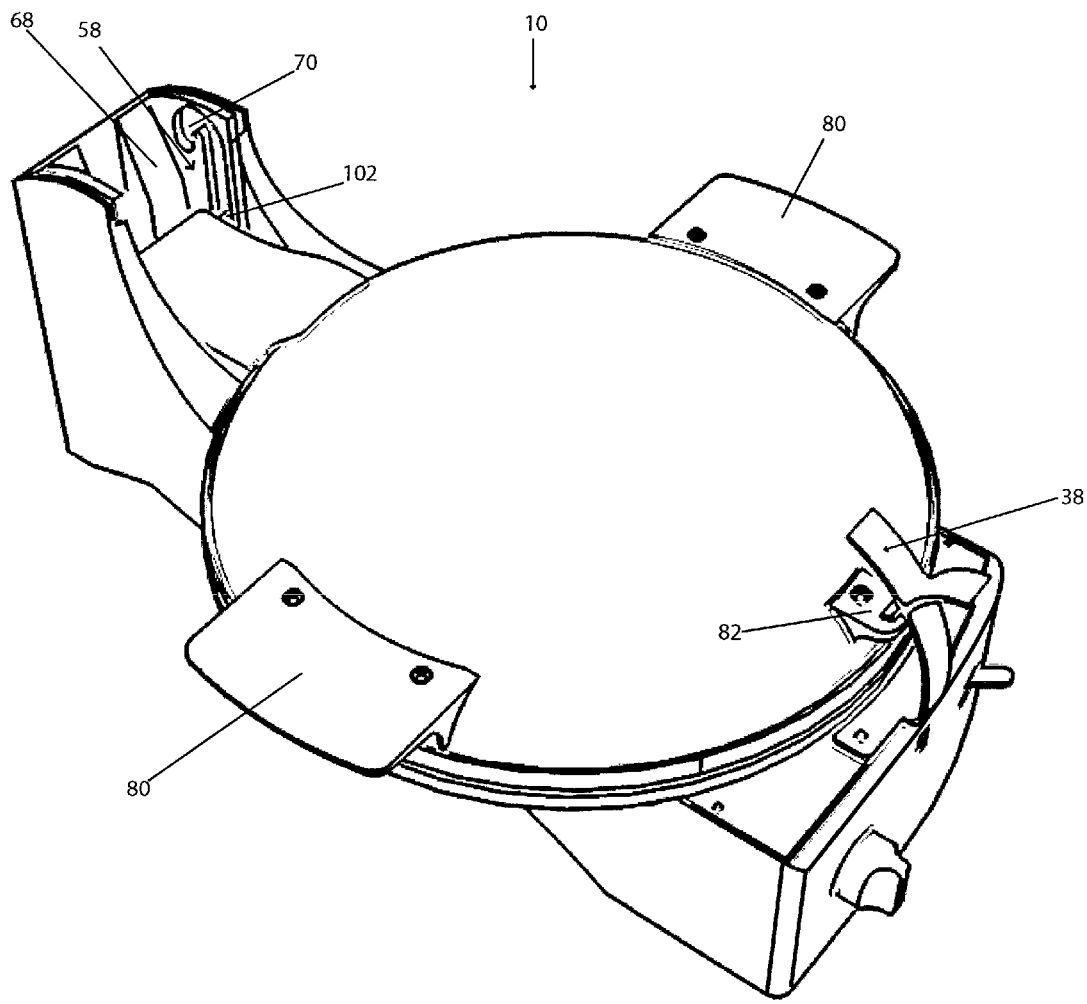
FIG. 10B is a top perspective view of the cooking appliance of FIG. 10A in the first operative position.

In a first operative position, the upper heating assembly 16 is lowered until the raised pattern 66 of the lower heating member 52 contacts the upper heating member 74, thereby enclosing a volume therebetween, as shown in FIGS. 10A and 10B. When in the first operative position, the securing member 39 of the lower latch member 38 engages the upper surface of the upper latch member 82. The lower latch member 38 is in an abutting relationship with the upper latch member 82, thereby securing the upper heating assembly 16 in an abutting relationship with the lower heating assembly 14. Lowering the upper heating assembly 16 into the first operative position compresses batter, for example, or material disposed on the lower cooking surface 67, thereby causing the batter to spread out along the lower cooking surface 67 within the volume defined by the raised pattern 66. In an embodiment, the upper heating assembly 16 may be lowered into an abutting relationship with the lower heating assembly 14 by grasping the handles 80 and translating the upper heating assembly 16 in a substantially vertical direction such that the hinge pin 102 translates along the substantially linear portion of the tracks 70 of the hinge guide 58. In another embodiment, the first operative position may be achieved by rotating the upper heating assembly 16 toward the lower heating assembly 14 until the raised edge 66 contacts the upper heating member 74. When the upper heating assembly 16 is rotated into the first operative position, the hinge pin 102 remains disposed at the lowermost location within the substantially linear portion of the tracks 70 of the hinge guide 58 and the upper heating assembly 16 rotates about the axis formed by the hinge pin 102. The first operative position allows the user to compress the foodstuff between the lower and upper heating assemblies 14, 16.

Figure 11A:
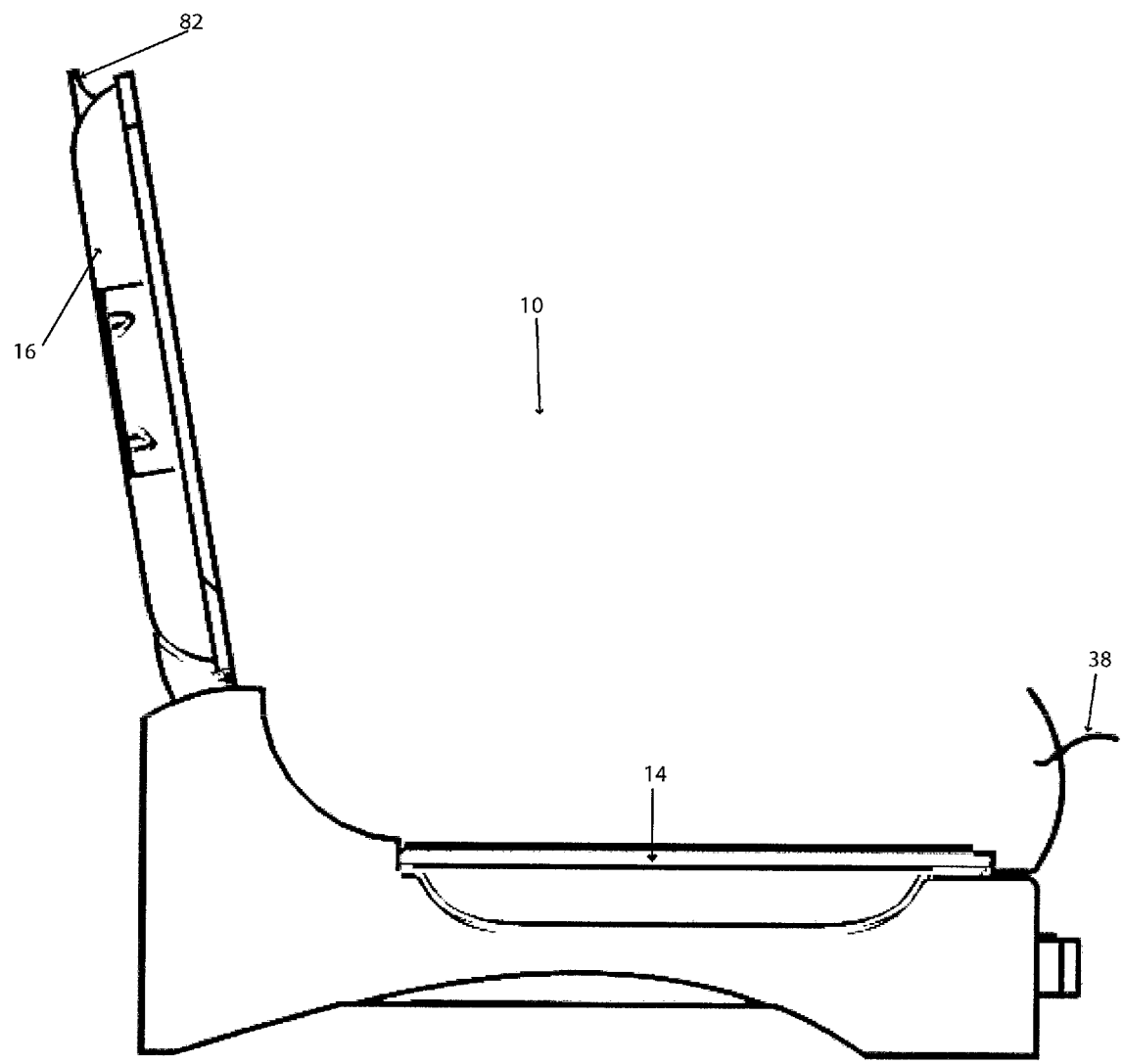
FIG. 11A is a side view of an embodiment of a cooking appliance in a second operative position.
Figure 11B:
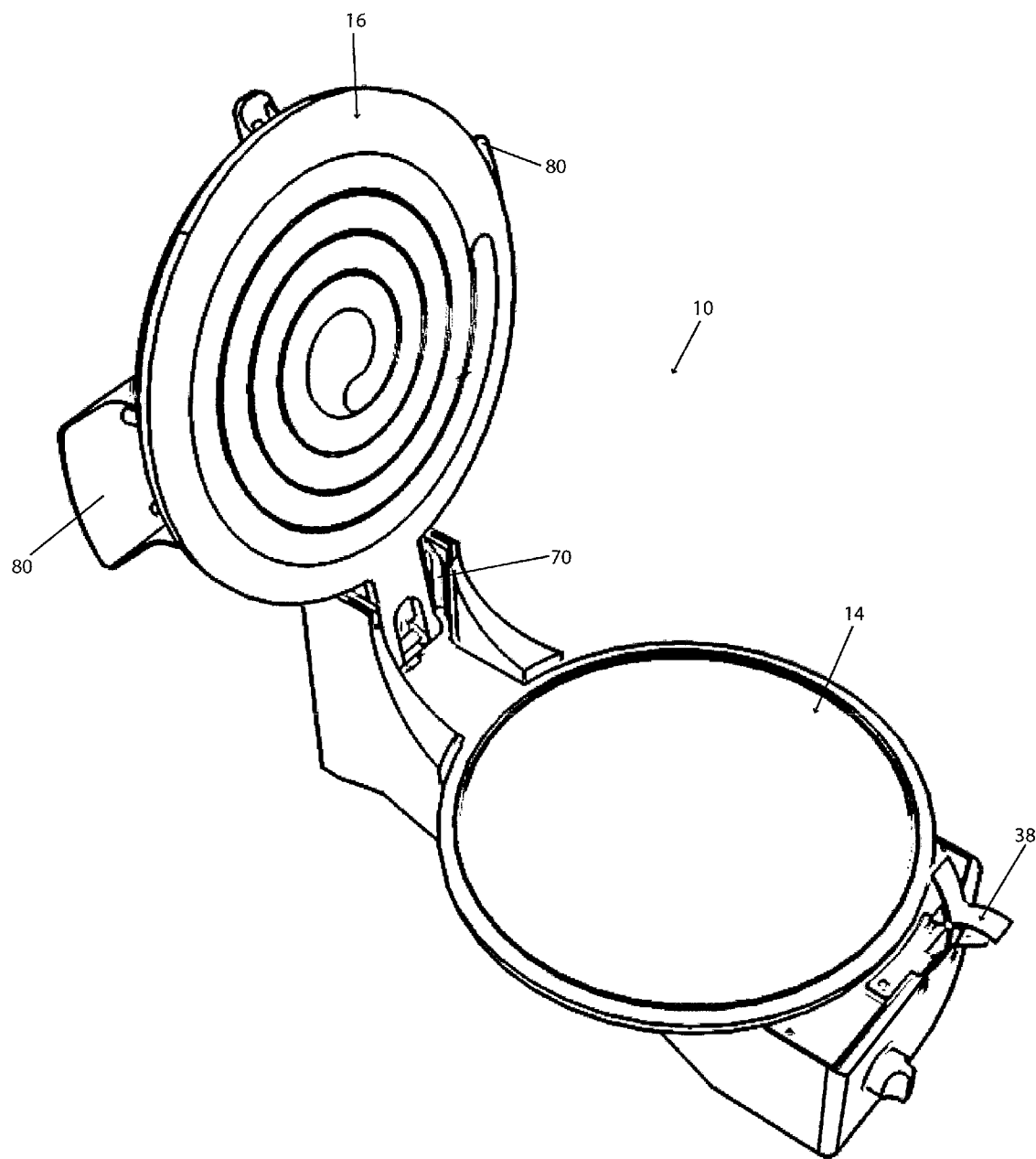
FIG. 11B is a top perspective view of the cooking appliance of FIG. 11A in the second operative position

In a second operative position, the upper heating assembly 16 is located at an angle relative to the lower heating assembly 14, as shown in FIGS. 11A and 11B. In the second operative position, the hinge pin 102 is located at the lowermost location of the substantially linear portion of the tracks 70 of the hinge guide 58. The lower latch member 38 is spaced apart from the upper latch member 82 when the upper heating assembly 16 is in the second operative position. The second operative position allows a user to open the cooking appliance 10 to add batter, for example, or a foodstuff onto the lower cooking surface 67. The second operative position also allows the user to utilize only the lower cooking surface 67 to cook a foodstuff. The second operative position may be useful to allow the user to prepare, for example, crepes, pancakes, or any foodstuff, by keeping the upper heating assembly 16 away from the lower cooking surface 67.

Figure 12A:
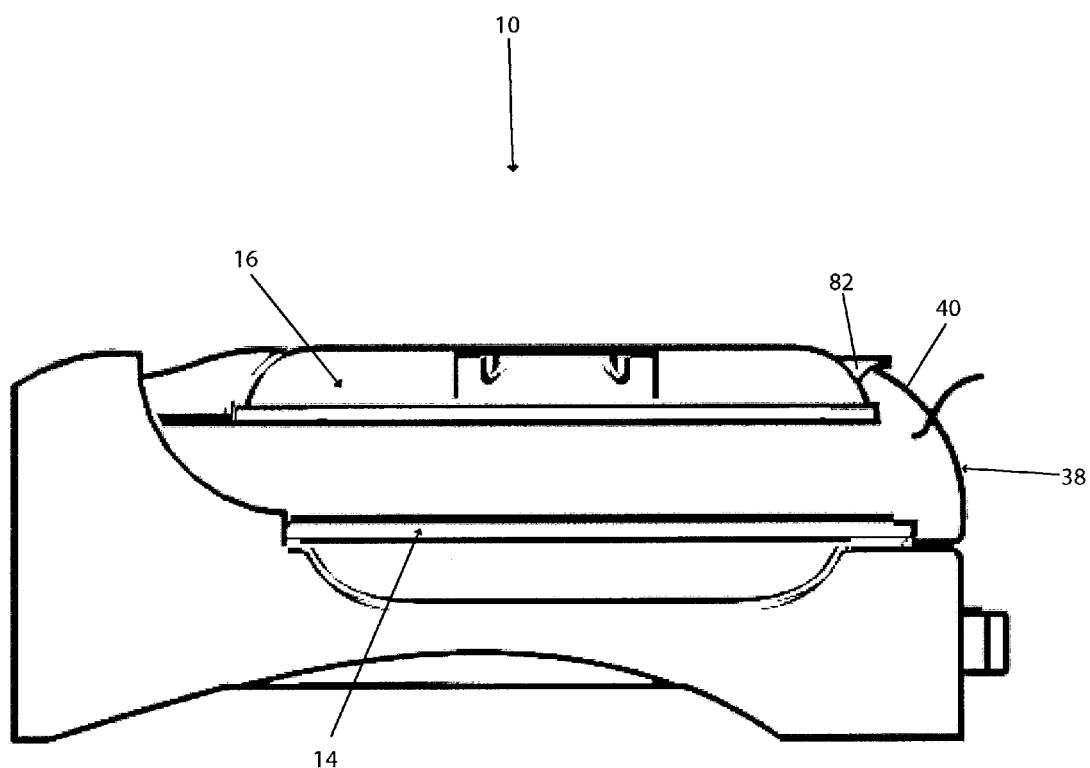
FIG. 12A is a side view of an embodiment of a cooking appliance in a third operative position.
Figure 12B:
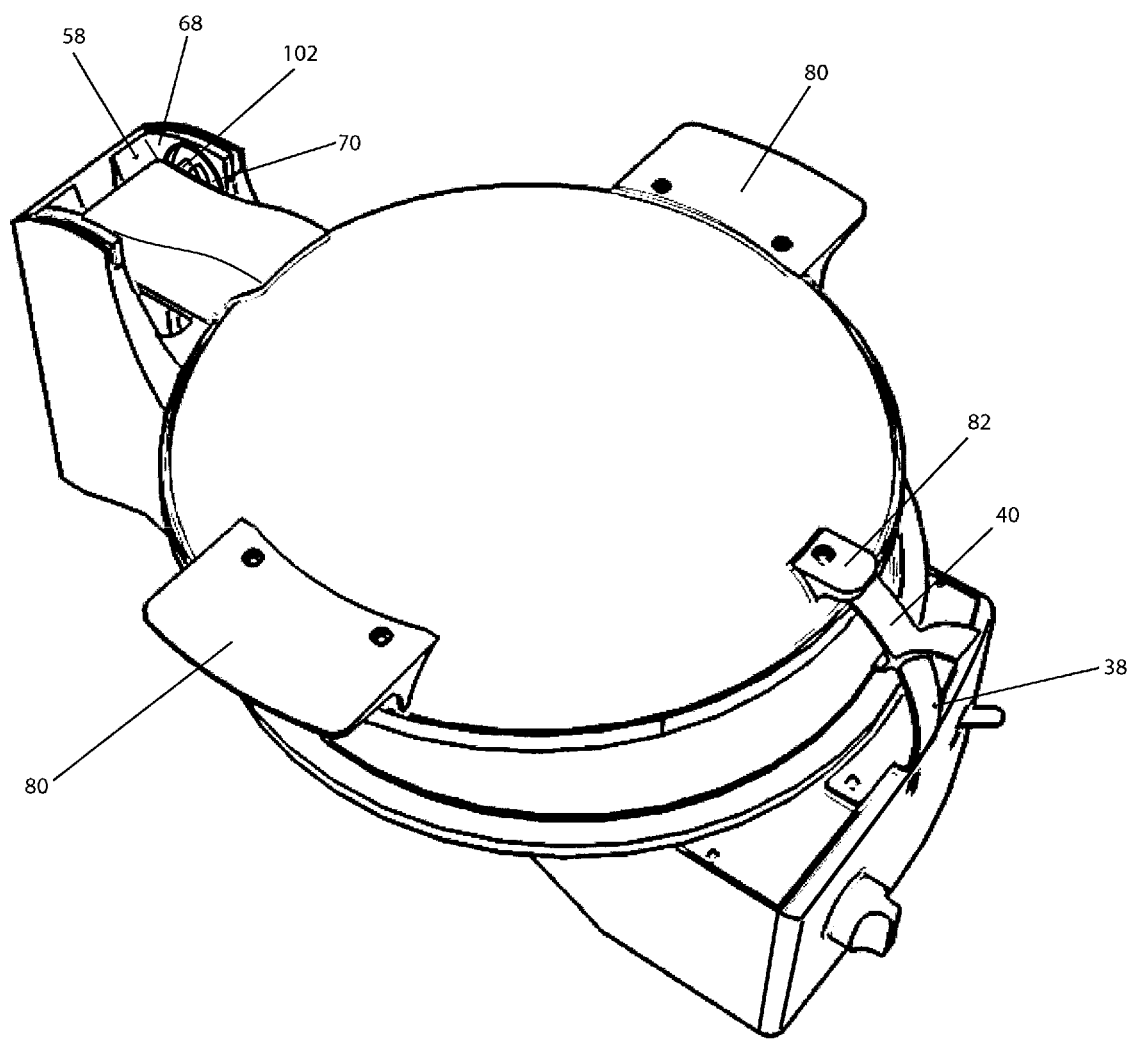
FIG. 12B is a top perspective view of the cooking appliance of FIG. 12A in the third operative position

In a third operative position, the upper heating assembly 16 is located in a supported, spaced-apart relationship relative to the lower heating assembly 14, as shown in FIGS. 12A and 12B. In the third operative position, the hinge pin 102 is located at the rearwardmost position of the arced portion of the tracks 70 of the hinge guide 58, thereby preventing the hinge pin 102 from translating downwardly within the substantially linear portion of tracks 70, thereby preventing the upper heating assembly 16 from lowering toward the lower heating assembly 14 without assistance from the user. In addition, the upper heating assembly 16 is maintained in the third operative position relationship relative to the lower heating assembly 14 by the upper latch member 82 engaging and being supported by the stabilizing member 40 of the lower latch member 38. It should be understood by one skilled in the art that the weight of the upper heating assembly may be distributed such that the upper heating assembly 14 may be positively located in the third operative position in a cantilevered manner without additional support from the lower latch member 38. When in the third operative position, the upper cooking surface 90 is supported in a substantially parallel manner relative to the lower cooking surface 67. When in the third operative position, the upper cooking plate 86 does not contact the lower cooking plate 64, and the upper heating assembly may be positively located in the third operative position and may or may not contact the foodstuff being cooked.

In the third operative position, the upper cooking surface 90 is spaced above the lower cooking surface 67 between about one-half (½) to five (5) inches (7.6-12.7 cm) when the hinge pin 102 is located in the rearwardmost position of the arced portion of the tracks 70. In an embodiment, the upper cooking surface 90 is spaced above the lower cooking surface 67 about one and one-half (1.5) inches when located in the third operative position. It should be understood by one skilled in the art that when in the third operative position, the upper cooking surface 90 may be spaced apart from the lower cooking surface 67 any distance sufficient to allow the foodstuff to be cooked using both the upper and lower cooking surfaces 67, 90 while the upper cooking surface 90 is secured in a substantially parallel relationship relative to the lower cooking surface 67. The stop members 48 and the lower latch member 38 ensure that the upper heating assembly 16 does not fall onto the lower heating assembly 14. In the third operative position, the upper cooking surface 90 may or may not contact the foodstuff being cooked. In another embodiment, the hinge pin 102 may be selectively located in the notches 174 (FIG. 6A) formed in the tracks 170, wherein upper cooking surface 90 is selectively locatable at a plurality of spaced-apart distances above the lower cooking surface 67. Each of the notches 174 provides another operative position for the upper heating assembly 16 relative to the lower heating assembly 14.

The second operative position allows the user to manipulate the shape of or otherwise access or modify a foodstuff without the user needing to hold the upper heating assembly 16 in the spaced-apart relationship relative to the lower heating assembly 14. For example, the user may add a filling onto the top surface of a dosa, dough, omelet, crepe or any foodstuff and roll the foodstuff into a substantially cylindrical form while the upper heating assembly 16 remains spaced above the rolled foodstuff. Once the foodstuff has been rolled, the user locates the upper heating assembly 16 in the third operative position to allow both the upper and lower cooking surfaces 67, 90 to continue to cook the foodstuff while the foodstuff is in contact with the lower cooking surface 67. In an embodiment, the upper cooking surface 90 may be maintained in the third operative position in which the upper cooking surface 90 is sufficiently near the rolled foodstuff to continue cooking the upper portion of the rolled foodstuff with the upper cooking surface 90. In the alternative, when in the third operative position, the upper cooking surface 90 is spaced apart a sufficient distance from the rolled foodstuff that the upper cooking surface 90 does not continue to cook the rolled or folded foodstuff.

To release the upper heating assembly 16 from the third operative position, the lower latch member 38 is bent in a forward manner such that the securing member 40 no longer engages the upper latch member 82. The upper heating assembly 16 may also be released from the third operative position by slightly raising the upper heating assembly 16 relative to the lower heating assembly 14, wherein the lower latch member 38 is self-biasing to a position that allows the upper heating assembly 16 to be translated relative to the lower heating assembly 14 without interference from the lower latch member 38.

Figure 13A:
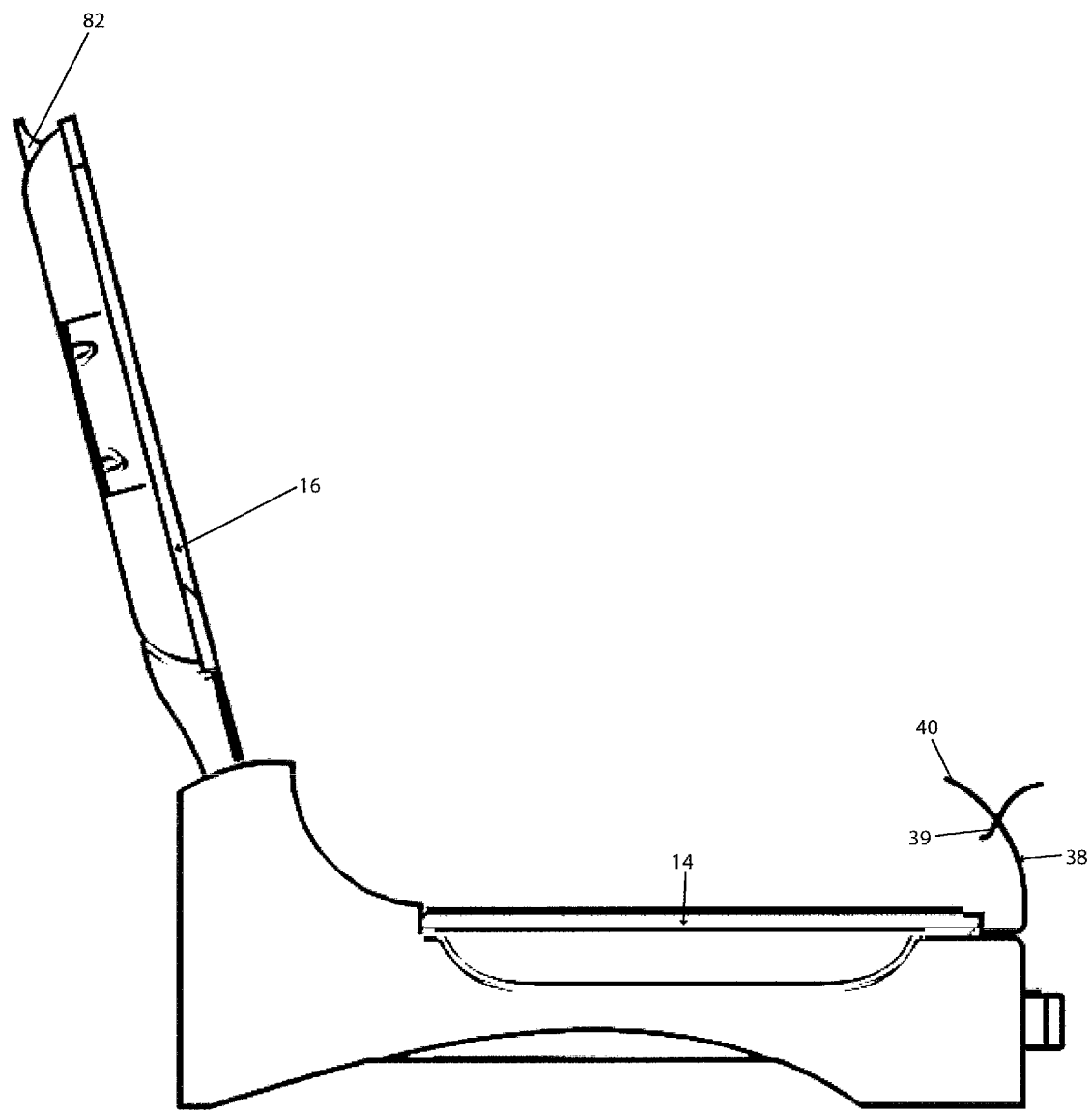
FIG. 13A is a side view of an embodiment of a cooking appliance in a fourth operative position.
Figure 13B:
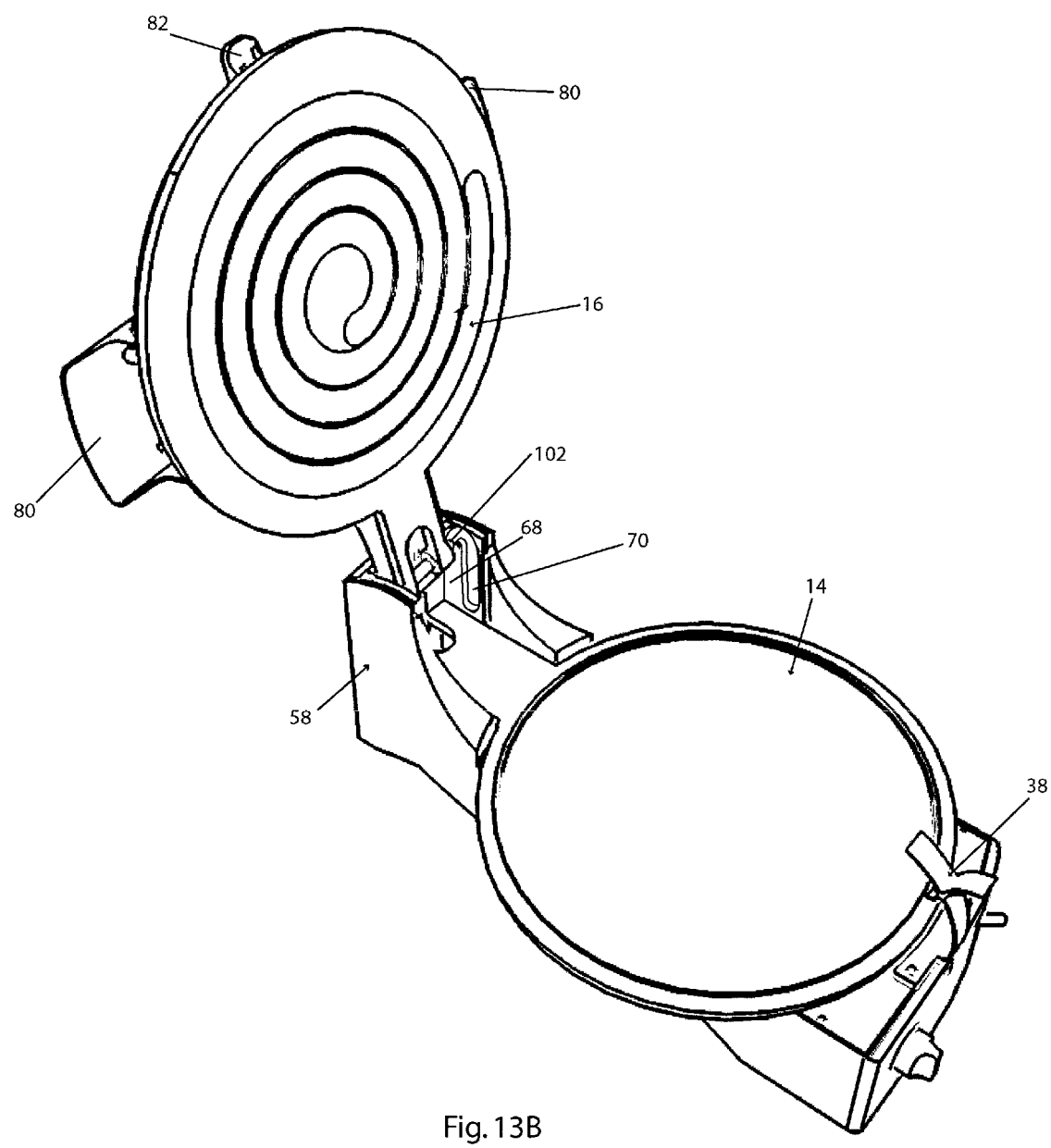
FIG. 13B is a top perspective view of the cooking appliance of FIG. 13A in the fourth operative position.

In a fourth operative position, the upper heating assembly 16 is located in a spaced-apart, angled relationship relative to the lower heating assembly 14, as shown in FIGS. 13A and 13B. In the fourth operative position, the hinge pin 102 is located in the rearwardmost position of the arced portion of the tracks 70 of the hinge guide 58 and the upper latch member 82 is spaced-apart from the securing member 39 of the lower latch member 38. The upper heating assembly 16 is rotated away from the lower heating assembly 14 until the hinge guide 58 contacts the hinge cover 78, thereby maintaining the upper heating assembly 16 in an opened position. Like the second operative position, the fourth operative position allows a user to add batter, a mixture or a foodstuff onto the lower cooking surface 67 while the upper heating assembly 16 is opened. The fourth operative position also allows the user to manipulate a foodstuff while it is cooking by rolling, flipping, or any other manner.

During use, the upper heating assembly 16 of the cooking appliance 10 is locatable to an unsupported position between one of the secured operative positions in which the upper cooking surface 90 is in contact with the upwardly directed surface of the foodstuff located between the lower and upper cooking surfaces 67, 90. In this position, the upwardly directed surface of the foodstuff maintains the upper heating assembly 16 in a spaced-apart relationship relative to the lower heating assembly 14, thereby preventing the upper heating assembly 16 from being lowered toward the lower heating assembly 14. The upper heating assembly 16 is supported in the spaced-apart position by the foodstuff located between the lower and upper heating assemblies 14, 16. When the upper heating assembly 16 contacts the foodstuff, the upper cooking surface 90 is maintained in a substantially parallel relationship relative to the lower cooking surface 67 by the foodstuff therebetween. The lower and upper cooking surfaces 67, 90 are both utilized in cooking the foodstuff. The spaced-apart distance at which upper cooking surface 90 is maintained relative to the lower cooking surface 67 is determined by the thickness of the foodstuff therebetween. For example, the cooking appliance 10 may be used to cook paninis, hamburgers, etc. wherein the upper heating assembly 16 may be lowered from the third operative position in a translational manner relative to the lower heating assembly 14 such that the upper cooking surface 90 contacts the top surface of the panini, thereby grilling both the bottom and top surfaces of the foodstuff.

The handles 80 of the upper heating assembly 16 allow the user to safely adjust the upper heating assembly 16 relative to the lower heating assembly 14 between the operative positions. The handles 80 may be used to move the upper heating assembly 16 relative to the lower heating assembly 14 in a substantially linear, translational manner, a rotational manner, or a combination thereof. It should be understood by one skilled in the art that the upper heating assembly 16 may translate relative to the lower heating assembly whereby the upper cooking surface 90 remains in a substantially parallel relationship with the lower cooking surface 67. While only four operative positions are described above, additional operative positions of the upper heating assembly 16 relative to the lower heating assembly 14 may be obtained through modification of elements described above, such as the tracks 70 or the lower latch member 38 that would be understood by one skilled in the art. It should also be understood by one skilled in the art that the lower cooking surface 67 may be used to cook a foodstuff alone or in combination with the upper cooking surface 90, depending upon the application for which the cooking appliance 10 is being used and the operative location at which the upper heating assembly 16 is located.

Figure 14:
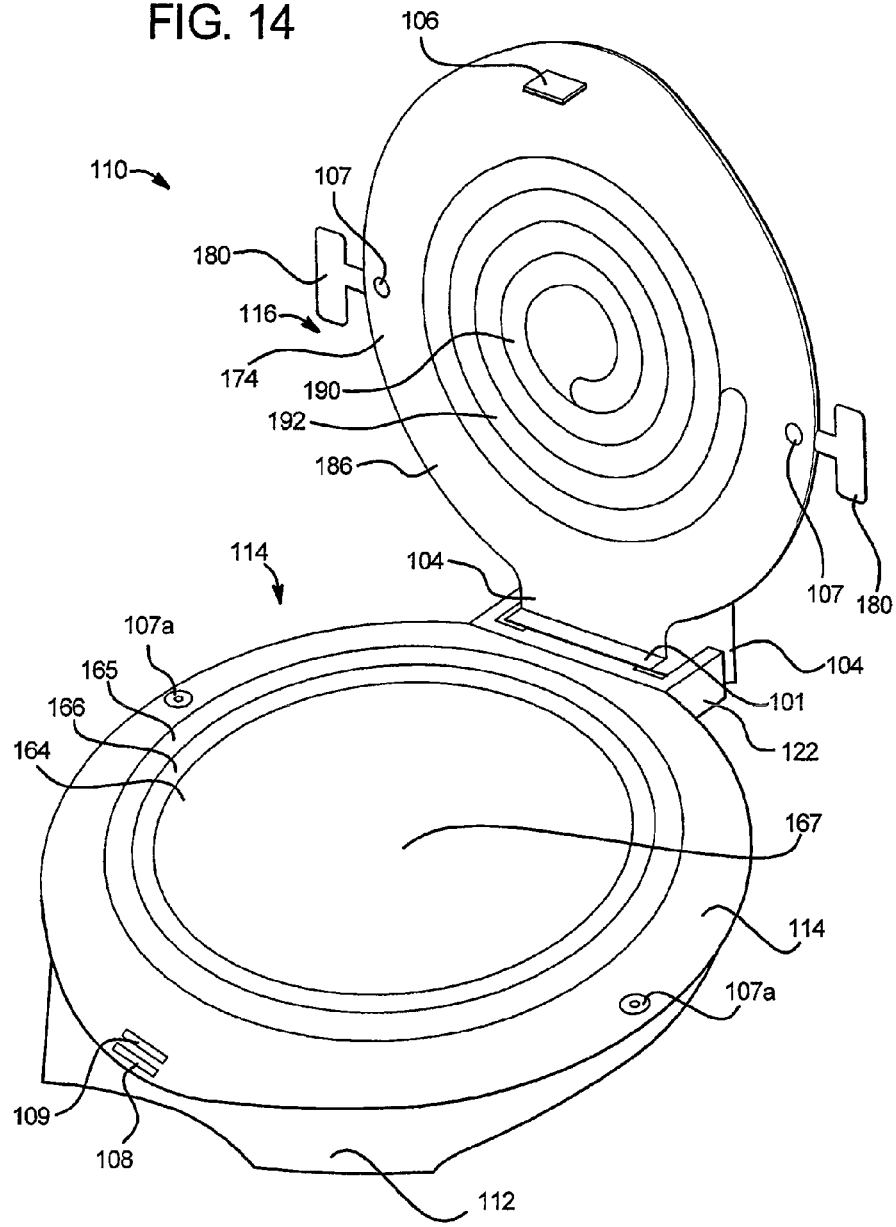
FIG. 14 is a perspective view of one embodiment of the cooking appliance in a first operative position.

Referring to FIG. 14, an embodiment of a cooking appliance 110 is shown. It should be appreciated that the embodiment of the cooking appliance 110 illustrated in FIGS. 14 to 17 may include any of the features disclosed with respect to cooking appliance 10, but not specifically described with respect to cooking appliance 110. In this embodiment, the cooking appliance 110 includes a lower heating assembly 114 and an upper heating assembly 116. A base 112 provides a solid foundation for the cooking appliance 110, thereby allowing the cooking appliance 110 to be placed on a countertop, tabletop, or any other sufficiently flat and sturdy surface. The base 112 may be formed of plastic, metal, metal in which at least a portion is overmolded with plastic, or any other material sufficient to support the lower and upper heating assemblies 114, 116 as well as provide heat insulation to prevent the user from being burned if the base 112 is touched during operation.

Figure 15:
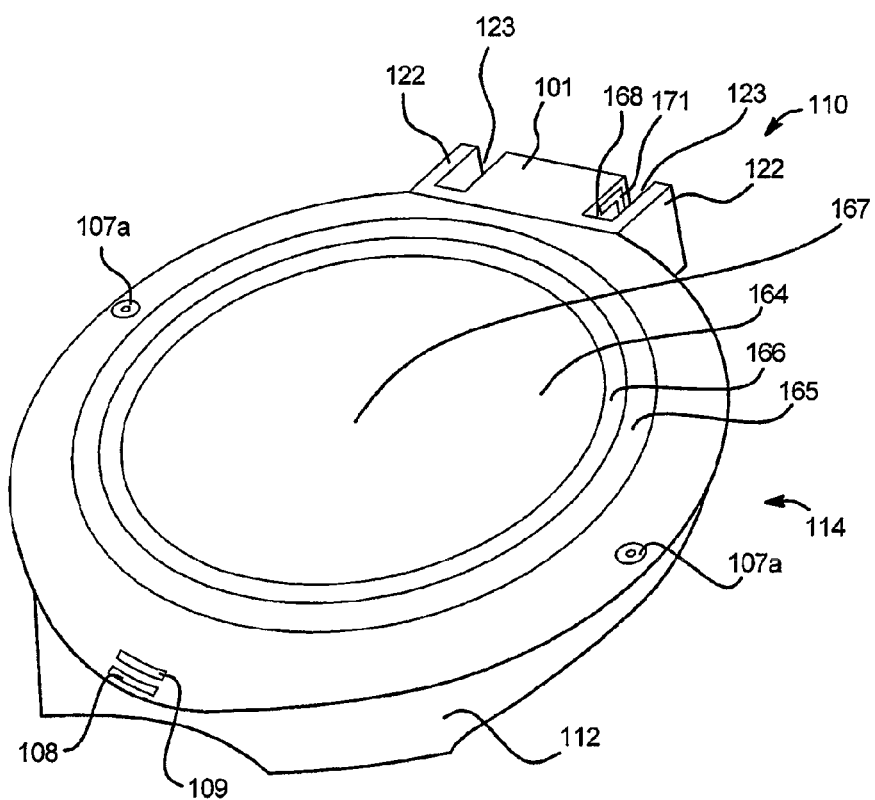
FIG. 15 is a perspective view of the lower heating assembly of one embodiment of the cooking appliance.

Referring specifically to FIG. 15, the lower heating assembly 114 of the cooking appliance 110 is shown. In this embodiment, the lower heating assembly 114 includes a lower cooking plate 164 defining a lower cooking surface 167. It should be understood by one skilled in the art that the lower cooking plate 164 may be round, square, triangular, rectangular, oval, or any other shape sufficient to provide a heated cooking surface. The lower cooking plate 164 may be made of a substantially non-stick material, or the lower cooking plate 164 may include a non-stick surface added to its surface.

In this embodiment, the lower cooking plate 164 includes a raised edge 166 that is spaced radially inward from the outer edge of the lower cooking plate 164, as shown in FIGS. 14 and 15. The raised edge 166 extends upwardly from the upper surface of the lower cooking plate 164, and the raised edge 166 is adapted to be in an abutting relationship with the upper heating assembly 116 when the cooking appliance 110 is in an operative position, as will be discussed below. In one example, during operation, a batter or mixture, for example, used to form a foodstuff is poured or placed onto the lower cooking surface 167 within the volume enclosed by the raised edge 166. The raised edge 166 is configured to contain the batter therewithin to prevent spillage if the user pours too much batter onto the lower cooking plate 64. It should be appreciated that the reservoir is not limited to collecting overflowing batter, the reservoir may collect, grease or fat from a cooking meat, or any other foodstuff by-product or element.

As illustrated in FIGS. 14 and 15, the lower cooking plate 164 includes a reservoir 165, located radially outward from the raised edge 166 but radially inward from the outer edge of the cooking plate 164. The reservoir 165 is adapted to receive excess batter not contained within the raised edge 166. The reservoir provides a secondary device for preventing excess batter from spilling out from the lower heating assembly 114. It should be appreciated that in various other embodiments, the cooking appliance 110 does not include the raised edge 166, but still includes reservoir 165. In these embodiments, the cooking appliance 110 is configured such that excess batter, for example, flows directly from lower cooking surface 167 into reservoir 165, which is recessed to collect excess batter. In further embodiments, the cooking appliance 110 does not include a reservoir that is recessed relative to the lower cooking surface 167, but rather, includes a cooking region that is recessed within the overall lower cooking plate, the region including a perimeter wall. In such embodiments, the cooking appliance 110 is configured such that adequate tolerance exists between the perimeter wall and the upper cooking surface 90, such that the upper cooking surface 90 has clearance to translate in a substantially vertical manner into the recessed cooking region of the lower cooking plate. This tolerance may be any suitable tolerance. In one embodiment, the tolerance enables excess batter to flow into the region between the upper cooking surface 90 and the perimeter wall when the cooking appliance 110 is in a closed position such that batter does not spill out of the cooking appliance 110.

Still referring to FIG. 15, in this embodiment, the lower heating assembly 114 includes a resting aperture 108 and a receiving aperture 109 both operable to receive a guide post 106. The function of the resting aperture 108 and the receiving aperture 109 in relation to the guide post 106 will be discussed in more detail below in the description of various operative positions of the cooking appliance 110. The lower heating assembly further includes female stabilizing members 107a configured to receive male stabilizing members 107, discussed in more detail below. It should be appreciated that the female stabilizing members 107a may be structurally integrated with the lower cooking plate 164 or may be attached to the lower cooking plate. It should be appreciated that in various other embodiments, the cooking appliance 110 need not include male and females stabilizing members 107 and 107a.

Figure 16A:
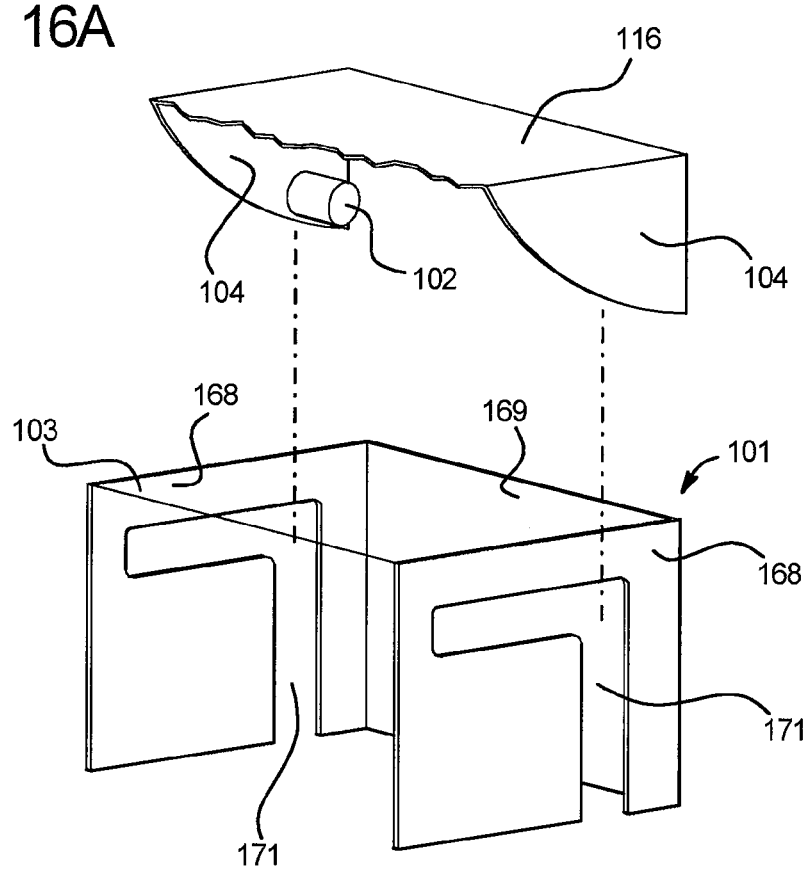
FIG. 16A is an exploded perspective view of a hinge assembly included in one embodiment of the cooking appliance.

The lower heating assembly 114 further includes a hinge assembly 101. FIG. 16A provides a detailed exploded view of the hinge assembly 101. The hinge assembly 101 includes a rear support member 169. Hinge support members 168 extend from rear support member 169. Hinge support members 168 each define a track 171 configured to receive a hinge pin 102. In various embodiments, the hinge pins 102 may be surrounded by a bearing or sleeve, to minimize friction between the hinge pins 102 and tracks 171. The tracks 171 each include a substantially horizontal portion and a substantially vertical portion extending from the substantially horizontal portion. The substantially vertical portion extends in a substantially perpendicular manner relative to the cooking surface of the lower cooking plate 164. It should be appreciated that although in this embodiment the tracks 171 are substantially L-shaped, the tracks 171 may be any suitable shape and extend any suitable direction. As illustrated in FIG.

16A, in this embodiment, the bottom of the tracks 171 are open, such that the hinge pins 102 may slide directly into the tracks 171 for ease of assembly. In this embodiment, the base 112 of the cooking appliance 110 defines the bottom of the tracks 171 when the cooking appliance 112 is assembled. It should be appreciated that in other embodiments, the bottom of the tracks 171 may not be open and hinge support members 168 may define the bottom of the tracks 171.

Figure 16B:
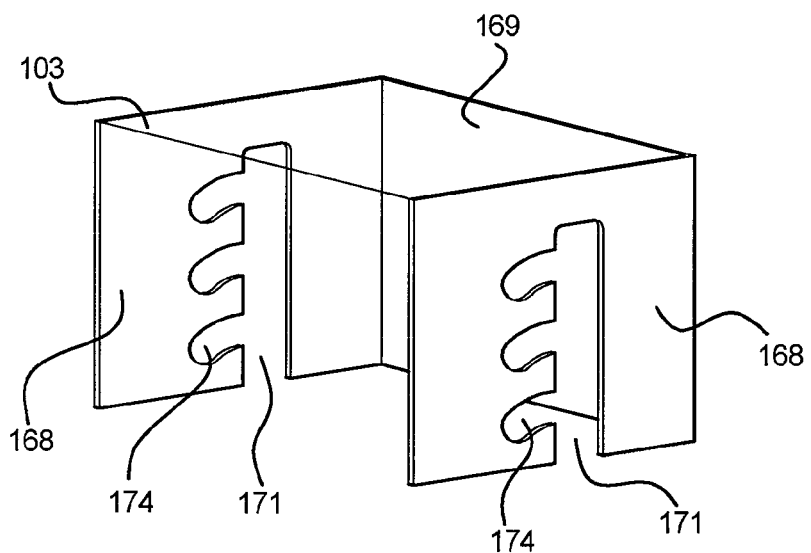
FIG. 16B is a perspective view of part of a hinge assembly included in one embodiment of the cooking appliance.

In another embodiment, the tracks 171 include a plurality of notches 174 extending from the substantially vertical portion of the tracks 171, as illustrated in FIG. 16B. The notches 174 are adapted to receive the hinge pins 102 to selectively locate and secure the upper heating assembly 116 at a plurality of heights relative to the lower heating assembly 114. It should be understood by one skilled in the art that the notches 174 may extend from the substantially vertical portion of the tracks 171 forwardly, rearwardly, or a combination thereof in an alternating or random manner.

On each respective side of the lower heating assembly 114, the lower heating assembly 114 and hinge support members 168 define a slot 123. Each slot 123 is configured to receive one of the hinge pin support members 104. The hinge assembly 101 includes a top plate 103 which connects to the hinge support members 168 and the rear support member 169. It should be appreciated that in various other embodiments, the hinge assembly 101 need not include rear support member 169 or the top plate 103 and hinge support members 168 may be connected by any suitable surface or connecting member. In this embodiment the top plate 103 is not connected to the lower cooking plate 164. In other embodiments, the top plate 103 and the lower cooking plate 164 may form one structure. It should be appreciated that in embodiments in which the hinge assembly 101 is not connected to the lower cooking plate 164, an insulating member may be placed between hinge assembly 101 and lower cooking plate 164.

Hinge pin support members 104 extend downward from the upper heating assembly 116. In this embodiment the pin support members 104 extend directly from the upper cooking plate 186. In various other embodiments, the pin support members 104 extend from a surface which is not part of, but which borders the upper cooking plate 186. It should be appreciated that in embodiments in which the upper cooking plate 186 is not connected to the surface from which the pin support members 104 extend, an insulating member may be placed between upper cooking plate 186 and the surface from which the pin support members 104 extend. Hinge pins 102 extend inwardly from hinge pin support members 104. When the upper and lower heating assemblies 114 and 116 are operatively coupled together, pins 102 reside in tracks 171. Pins 102 are sized such that adequate clearance remains between the outer perimeter of the pins 102 and tracks 171 to allow substantially resistance-free movement of the hinge pins 102 relative to the tracks 171, and hence substantially resistance-free movement of the upper heating assembly 116 relative to the lower heating assembly 114. Similarly, sufficient clearance exists between hinge support members 168 and hinge pin support members 104 to allow substantially resistance-free movement of the upper heating assembly 116 relative to the lower heating assembly 114.

The hinge pins 102 allow the upper heating assembly 116 to translate in a substantially vertical manner relative to the lower heating assembly 114, wherein the upper cooking surface 190 may be maintained in a substantially parallel relationship relative to the lower cooking surface 167. The hinge pins 102 also allow the upper heating assembly 116 to rotate about the axis formed by the hinge pin 102 relative to the lower heating assembly 114, wherein the upper cooking surface 190 may be located in an angled position relative to the lower cooking surface 167. Also, the hinge pins 102 allow the upper heating assembly 116 to translate in a substantially horizontal manner relative to lower heating assembly 114.

It should be appreciated that in various embodiments (not shown), lower cooking plate 164 may be removable and interchangeable such that the user may remove or replace the lower cooking plate 164 having a flat lower cooking surface 167 with a lower cooking plate 164 having a different patterned lower cooking surface 167.

Figure 17:
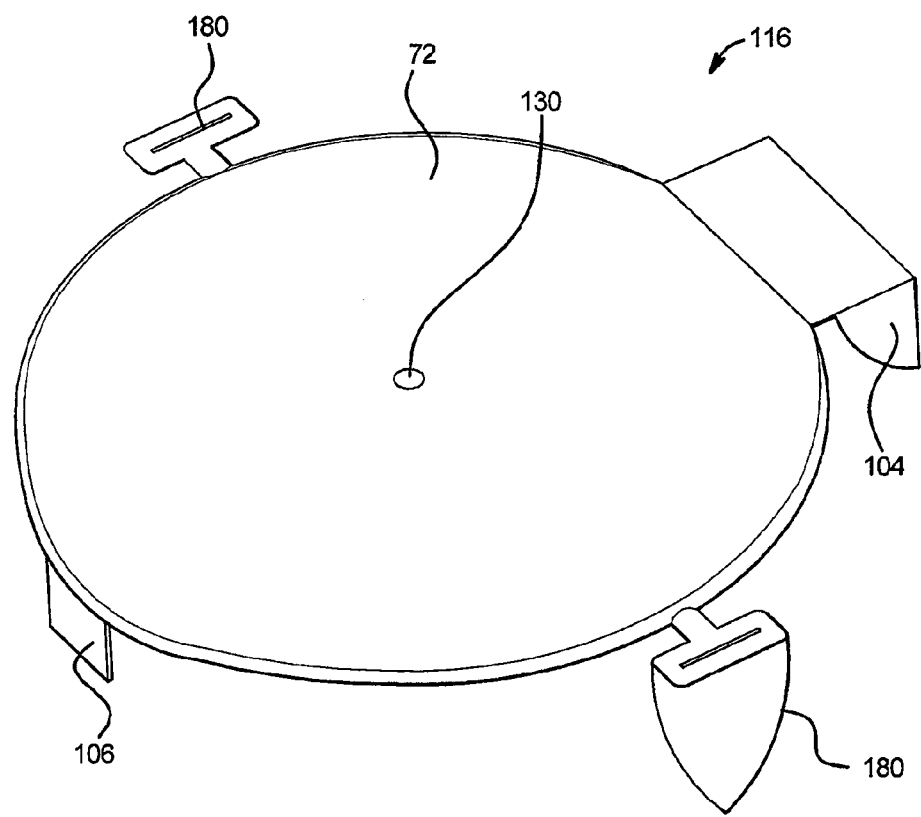
FIG. 17 is a perspective view of the upper heating assembly of one embodiment of the cooking appliance.

FIGS. 14 and 17 illustrate the upper heating assembly 116 of cooking appliance 110. The upper heating assembly 116 includes, among other components, an upper cover 72, a pair of handles 180, a guide post 106, and a light 130. A lower side of the upper heating assembly 116, as illustrated in FIG. 14, includes male stabilizing members 107, an upper cooking plate 186 and an upper cooking surface 190 including a raised pattern 192.

In various embodiments, the light 130 may be a variety of colors and serve a variety of purposes. In one embodiment, the light 130 illuminates when the cooking appliance 110 is on. In other embodiments, the light may serve as: (a) a pour, or "cook," light, illuminating when the lower cooking surface 167 has reached or rises above a designated temperature, such as for example, 215° F.; (b) an "ON" light, indicating that the heating element is heating one of the upper and lower cooking surfaces 167 and 190; (c) a timer light, illuminating when a designated amount of time has elapsed from a designated starting time; or (d) any other suitable indication mechanism. It should be appreciated that the cooking appliance 110 may include multiple lights, each of the lights individually capable of illuminating in different colors for different purposes. Further, it should be appreciated that although FIG. 17 illustrates a light 130 on the top of the cooking appliance 110, one or more lights may be located anywhere on the cooking appliance 110 in various other embodiments.

In this embodiment, the upper heating assembly 116 includes a pair of opposing handles 180. The handles may be attached to the upper cover 72 or formed as one unit with the upper cover, as illustrated in FIG. 17. The handles 180 extend laterally from opposing sides of the cover 72. The handles 180 allow the user to lift the upper heating assembly 116 relative to the lower heating assembly 114.

In one embodiment, a guard extends downward from at least a portion of the upper heating assembly 116 over the edges of the upper cooking plate 186, which protects a user from burns. The guard may be composed of any suitable insulating material and may be any suitable shape. In various embodiments, the guard may be structurally part of the upper cover 72 or be attached to the upper cover 72.

The upper heating assembly 16 also includes a guide post 106 which extends from the upper cooking plate 186, as illustrated in FIGS. 14 and 17. It should be appreciated that in this embodiment, the guide post 106 may be attached to the upper cooking plate 186 and is composed of a different material than the upper cooking plate 186. It should be appreciated that in other embodiments, the guide post 106 is attached to other surfaces of the upper heating assembly 116. Further, it should be appreciated that the guide post 106 may be structurally integrated with and/or made of the same material as the upper cooking plate 186. In other embodiments, the guide post 106 could be removable from upper heating assembly 106, for replacement, cleaning or other purpose. Additionally, in another embodiment, the guide post 106 could be adjustable to various lengths. This could be accomplished by, for example, a telescoping guide post (not shown); multiple sized guide posts 106 which are interchangeable; or any other suitable guide post design.

In this embodiment, the guide post 106 is substantially rectangular, tapering as it extends downward from the upper heating assembly 116. It should be appreciated that in various other embodiments, the guide post may be any of: (a) circular; (b) square; (c) polygonal; (d) or any other suitable shape.

It should be appreciated that in other embodiments, the guide post may be composed of two portions, each of the portions being different materials. For example, in one embodiment, a first portion of the guide post 106 is stainless steel and a second portion of the guide post 106 is teflon. In various such embodiments, the guide post 106 could include any number portions composed of any suitable materials. In various other such embodiments, each of the portions of the guide post 106 could have different perimeters or diameters. For example, in one such embodiment in which each of two portions of the guide post 106 are circular, a first portion of the guide post 106 extending directly from the upper cooking plate 106 could have a first diameter and a second portion of the guide post 106 extending from the first portion of the guide post could have a second diameter which is smaller than the first diameter.

Additionally, as discussed with respect to the lower heating assembly 114, the upper heating assembly 116 includes male stabilizing members 107, which extends from the upper cooking plate 186. The female stabilizing members 107a are configured to receive the male stabilizing members 107. As in the case of the guide post 106, the male stabilizing members 107 may be structurally integrated with or attached to the upper cooking plate 186 and may be composed of the same or a different material than the upper cooking plate 186.

Further, it should be appreciated that, although in this embodiment, the cooking appliance 110 includes one guide post 106 and two male stabilizing members 107, the cooking appliance 110 may include any number of guide posts and male stabilizing members. Also, although in this embodiment, the guide post 106 extends from the front of the upper heating assembly 116, in other embodiments, the upper guide post or posts may, in addition to the male stabilizing members 107, extend from any portion of the upper heating assembly 116. Similarly, the lower heating assembly 114 may define receiving apertures or female stabilizing members 107a at any location to receive each of these respective guide posts or male stabilizing members 107.

It should be understood by one skilled in the art that the upper cooking plate 186 may be round, square, triangular, rectangular, oval, or any other shape sufficient to provide a heated cooking surface. In one embodiment, the lower thermostat assembly 56 controls the temperature of the lower and upper cooking surfaces 167, 190. In another embodiment, the temperature of the lower cooking surface 167 is controlled by the lower thermostat assembly 56 and the temperature of the upper cooking surface 190 is controlled by an upper thermostat assembly (not shown). The upper cooking plate 186 may be made of a substantially non-stick material, or the upper cooking plate 186 may include a non-stick surface added to its surface.

As illustrated in FIG. 14, the upper cooking surface 190 includes a raised pattern 192 having a spiral shape. It should be appreciated that the cooking appliance 110 may be utilized to cook any foodstuff or type of food with any shape or pattern on one or both of the top and bottom surface of the foodstuff. Patterns for one or both of the upper and lower cooking assemblies could include features, including but not limited to: (a) straight lines; (b) curved lines; (c) concentric circles; (d) overlapping circles; (e) concentric squares; (f) overlapping squares; (g) concentric ovals; (h) overlapping ovals; (i) concentric diamonds; (j) overlapping diamonds; (k) concentric polygons; (l) overlapping polygons; (m) a spiral shape; (n) circles; (o) squares; (p) ovals; (q) diamonds; and (r) polygons. Examples of such pattern elements are illustrated in FIG. 23.

In various embodiments, one or both of the upper heating assembly 116 and the lower heating assembly 14 may include one or more vents which enhance air circulation or serve any suitable air flow purpose.

In operation, the cooking appliance 110 includes three primary operative positions in which the upper heating assembly 116 may be selectively located at a different position or orientation relative to the lower heating assembly 114. Each of the operative positions provides the cooking appliance 110 with operational advantages, thereby allowing a user to cook a variety of different foodstuffs or allowing the user to manipulate the foodstuff being cooked by selectively relocating the upper heating assembly 116 between the operative positions.

In a first operative position, the upper heating assembly 116 is located at an angle relative to the lower heating assembly 114, as shown in FIG. 14. In the first operative position, the pins 102 are resting at the intersection of the substantially vertical portion and the substantially horizontal portion of the tracks 171. The first operative position allows a user to open the cooking appliance 110 to add a foodstuff onto the lower cooking surface 167. The first operative position also allows the user to utilize only the lower cooking surface 167 to cook a foodstuff.

In a second operative position, the upper heating assembly 116 is lowered until the bottom of guide post 106 abuts the bottom of the resting aperture 108. The resting aperture 108 is configured such that the guide post 106 does extend all the way into the aperture. When the guide post 106 is resting in the resting aperture 108, the upper heating assembly 116 is substantially parallel to but spaced above the lower cooking surface 167. It should be understood by one skilled in the art that when in the second operative position, the upper cooking surface 190 may be spaced apart from the lower cooking surface 167 any distance sufficient to allow the foodstuff to be cooked using both the upper and lower cooking surfaces 167, 190 while the upper cooking surface 190 is secured in a substantially parallel relationship relative to the lower cooking surface 167. In the second operative position, the upper cooking surface 190 may, but does not have to, contact the foodstuff being cooked.

To get the cooking appliance 110 into this second operative position from the first operative position illustrated in FIG. 14, a user grasps the handles 180, rotates the upper heating assembly 116 such that it is substantially parallel to the lower heating assembly 114, pulls the upper heating assembly 116 forward until the guide post 106 is above the resting aperture 108, and allows the guide post 106 to rest in the resting aperture 108. It should be appreciated that when in the second operative position, the pins 102 are at the ends of the substantially horizontal portions of the tracks 171 which correspond to the front of the cooking appliance 110. As the user pulls the upper heating assembly 116 forward, the pins 102 travel forward along the substantially horizontal portion of the tracks 171. It should be appreciated that in the second operative position, the upper cooking assembly may or may not contact the food item. In one embodiment, the upper heating assembly 116 may include a weight comprised of any suitable material placed at a designated position in the upper heating assembly 116. In various embodiments, the weight is positioned to assist in guiding the upper heating assembly 116 from the first operative position to the second operative position.

In fact, in one example during operation, a user could cook a meat item, such as a hamburger, in the cooking appliance 110 in the second operative position, wherein the upper heating assembly 116 does not contact the top surface of the hamburger. In the second operative position, the upper heating assembly 116 is substantially parallel to the lower heating assembly 114, allowing uniform convection along the top of the hamburger, and accordingly, fat to drain proportionally from the top of the hamburger down.

Figure 20:
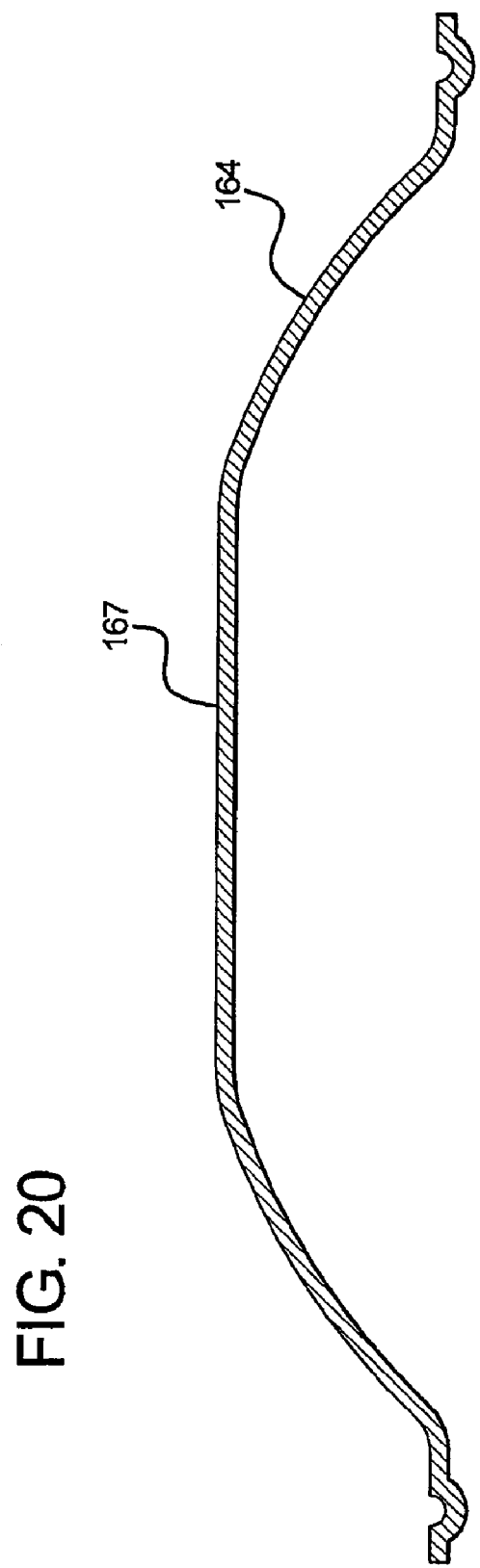
FIG. 20 is a side view of one configuration of a lower cooking plate.

In one embodiment, which could be utilized in the above example, the lower cooking plate 164 is concave downward, with a flat plateau configured to accommodate a foodstuff on its top. Fat, or any other foodstuff byproduct, would drain from the plateau, down the concave surface of the lower cooking plate 164, and ultimately into the reservoir 165. An example of such a lower cooking plate 164 is illustrated in FIG. 20. This lower cooking plate 164 could be interchangeable with any of the other cooking plates disclosed herein or configured such that it rests on top of any of the lower cooking plates disclosed herein.

Lowering the upper heating assembly 116 into a third operative position from the second operative position may compress the foodstuff disposed on the lower cooking surface 167. In one example, this could cause batter to spread out along the lower cooking surface 167 within the volume defined by the raised pattern 166. In one embodiment, the upper heating assembly 116 is lowered into an abutting relationship with the lower heating assembly 114 by grasping the handles 180 and translating the upper heating assembly 116 in a substantially vertical direction such that the hinge pins 102 translate along the substantially vertical portion of the tracks 171. When the cooking assembly 110 is in the third operative position, the hinge pins 102 are disposed at the lowermost location within the substantially vertical portion of the tracks 171. In this embodiment, the upper heating assembly 116 is in the second operative position before being moved to the third operative position. However, it should be appreciated that in various other embodiments, the upper heating assembly 116 may be moved directly from its position in the first operative position to that of the third operative position, or any other suitable position.

Figure 21:
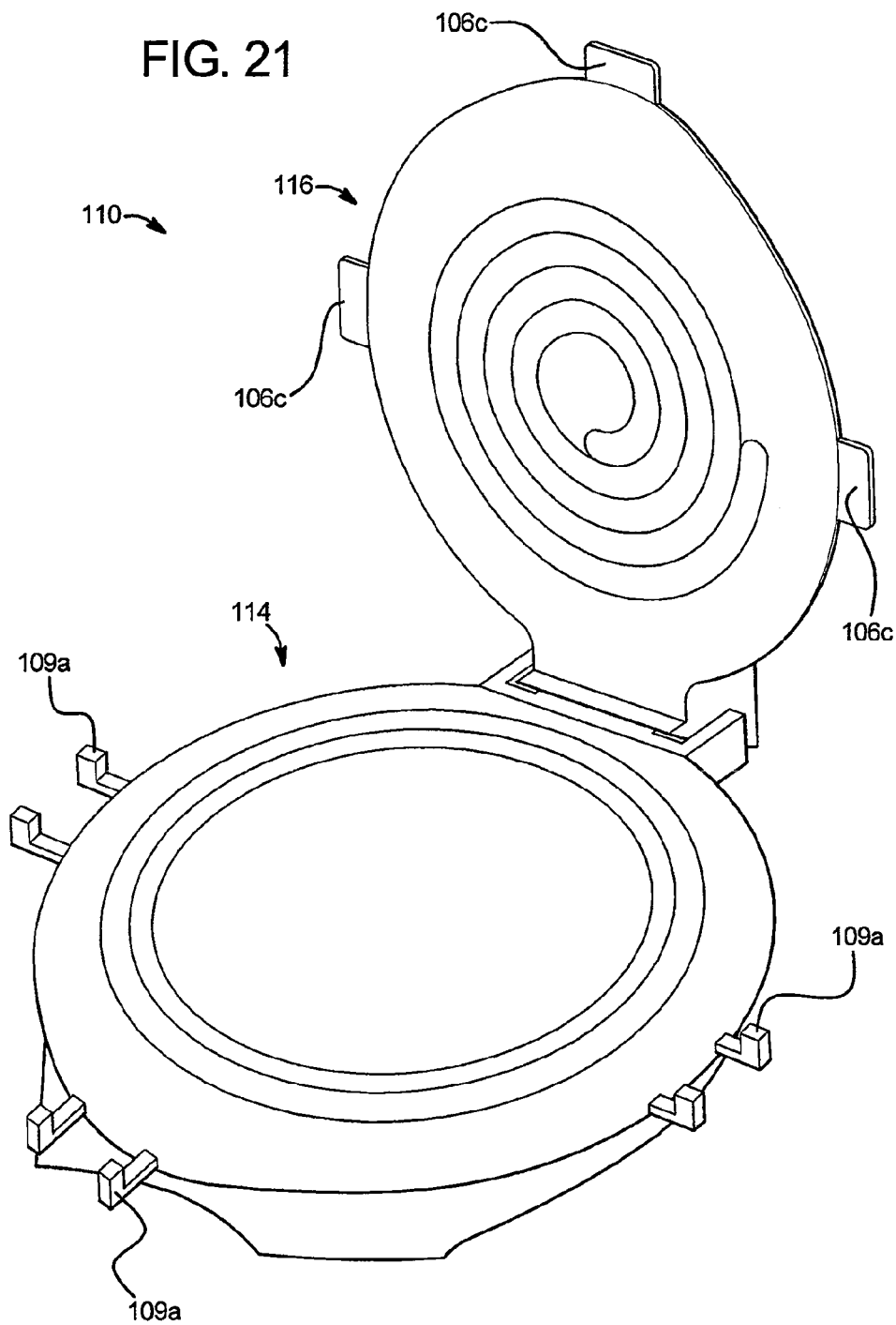
FIG. 21 is a perspective view of an embodiment of the upper and lower heating assemblies of the cooking appliance.
Figure 22:
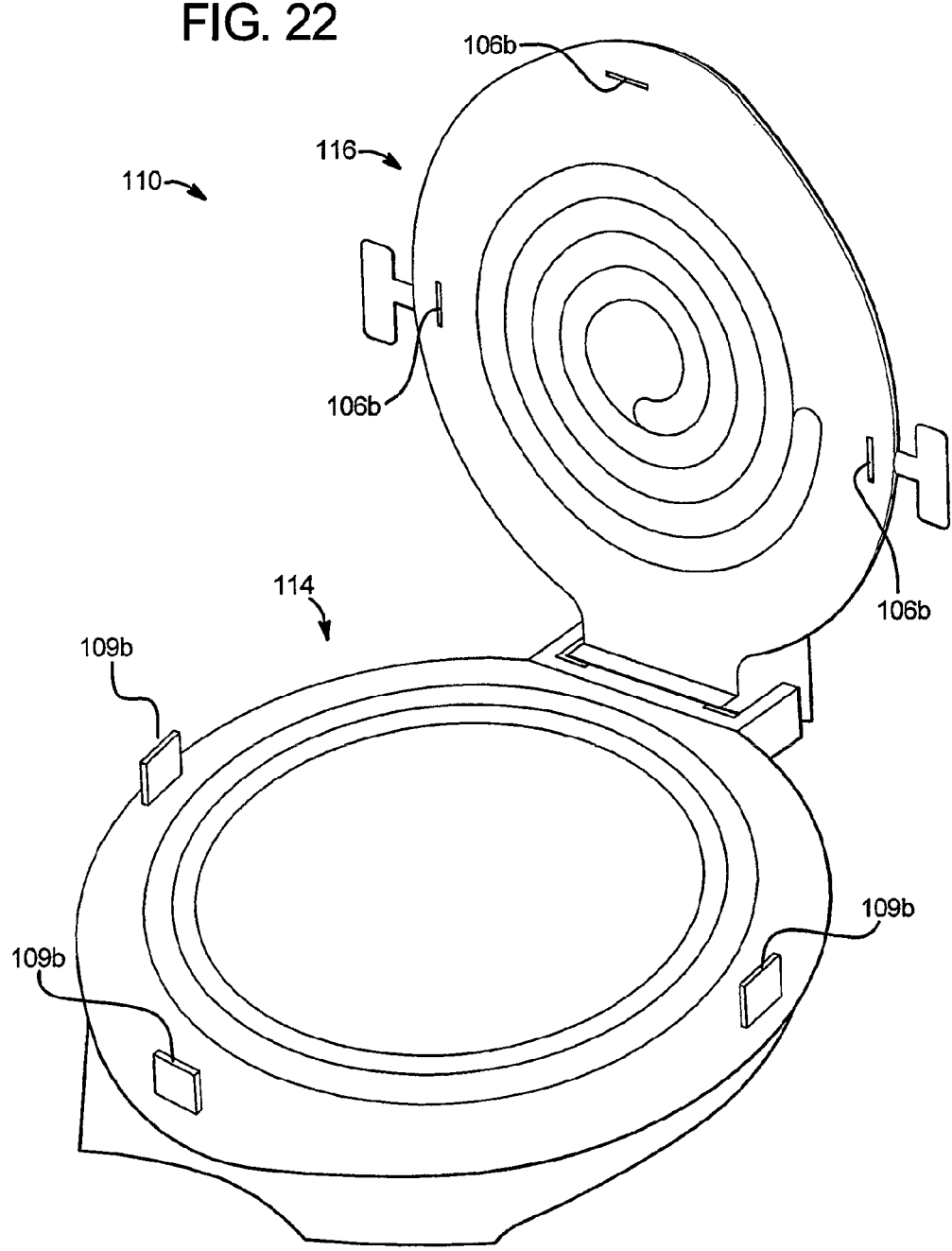
FIG. 22 is a perspective view of an embodiment of the upper and lower heating assemblies of the cooking appliance.

As discussed, when in the second operative position, the guide post 106 rests in the resting aperture 108. To get to the third operative position, the user grasps the handles 180 and slides the upper heating assembly 116 backwards until the guide post 106 is over the receiving aperture 109. As the upper heating assembly 116 is sliding backwards, the pins 102 travel along the substantially horizontal portion of the tracks 171. Once the guide post 106 is above the receiving aperture 109, the user lowers the upper heating assembly downward, such that the pins 102 slide downward along the substantially vertical portion of the tracks 171 and the guide post 106 is lowered into the receiving aperture 109. Configuring the cooking appliance 110 such that the user has to have the cooking appliance 110 in the second operative position before moving it to the third operative position and incorporating the guide post 106 ensures that the upper heating assembly 116 translates towards the lower heating assembly 114 in a substantially vertical manner. Or stated alternatively, such that the upper heating assembly 116 is substantially parallel to the lower heating assembly 114 as it translates relative to the lower heating assembly 114. There are other ways this may be accomplished as well. For example, in the embodiment illustrated in FIG. 21, a plurality of substantially horizontal guides 106c extend from the upper heating assembly 116 and a plurality of pairs of guide posts 109a extending substantially upward from the lower heating assembly 114 define a plurality of respective apertures which are configured to receive the substantially horizontal guides 106c. In another embodiment, illustrated in FIG. 22, a plurality of guide posts 109b extend from the lower heating assembly 114 and the upper heating assembly 116 defines a plurality of apertures 106b, which are configured to receive the respective guide posts 109b. It should be appreciated that although the embodiments illustrated in FIGS. 21 and 22 include three respective guide posts and apertures, any number of guide posts and apertures could be utilized with the cooking appliance 110.

It other embodiments, the cooking appliance 110 may be moved into the third operative position directly from the first operative position, such as by use of a cantilever assembly, or any other suitable mechanical or electromechanical device. An example of a suitable cantilever assembly is that disclosed in U.S. Pat. No. 2,057,501, which is hereby fully incorporated by reference. Another alternative mechanism for lowering the upper heating assembly 116 could be that disclosed in U.S. Publication No. 2006/0213373, which is hereby fully incorporated herein by reference.

While three operative positions for cooking assembly 110 are described above, additional operative positions of the upper heating assembly 116 relative to the lower heating assembly 114 may be obtained through modification of elements described above, such as the tracks 171 or the guide post 106 that would be understood by one skilled in the art. It should also be understood by one skilled in the art that the lower cooking surface 167 may be used to cook a foodstuff alone or in combination with the upper cooking surface 190, depending upon the application for which the cooking appliance 110 is being used and the operative location at which the upper heating assembly 116 is located.

Figure 18:
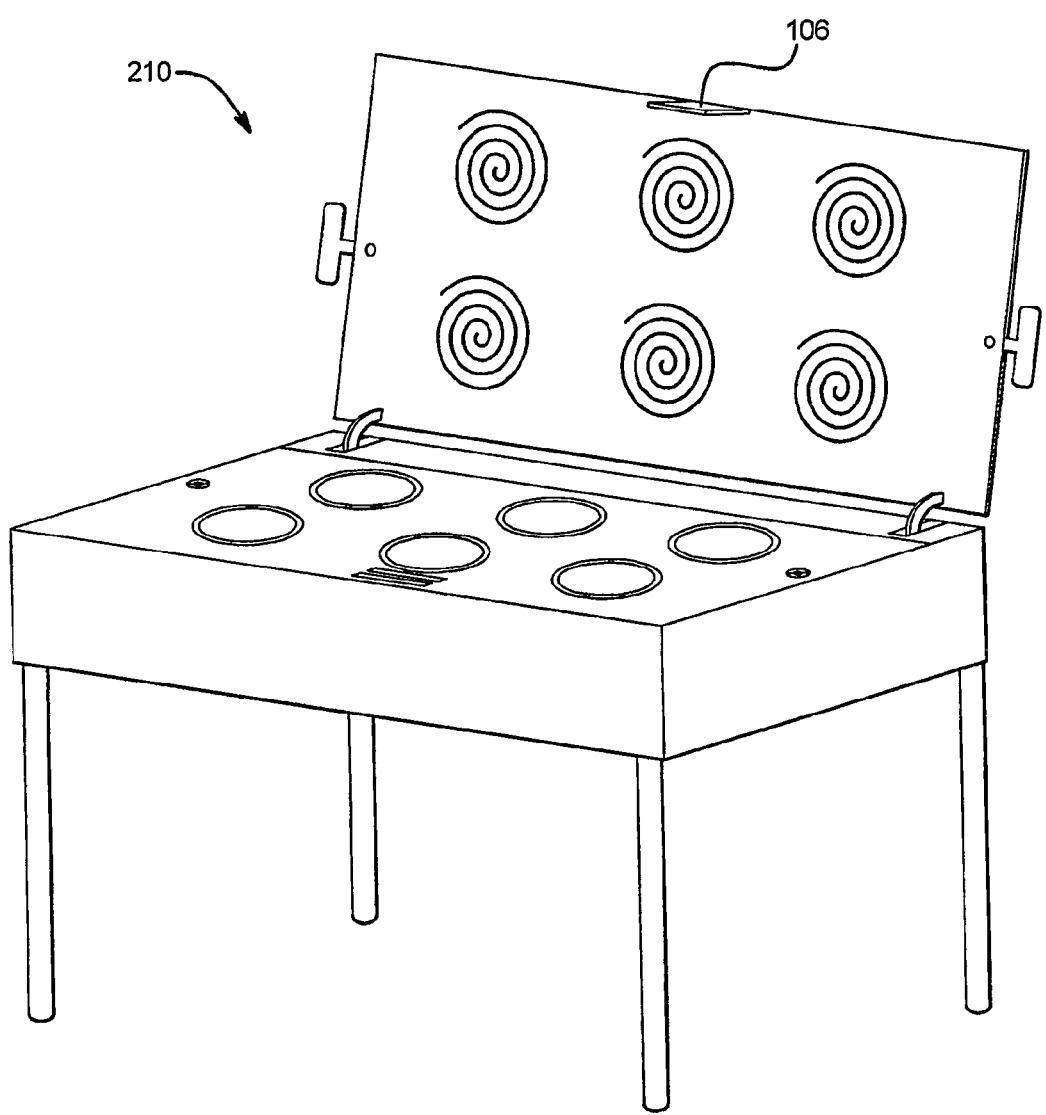
FIG. 18 is a perspective view of one embodiment of a cooking appliance including a plurality of respective upper and lower cooking surfaces.
Figure 19:
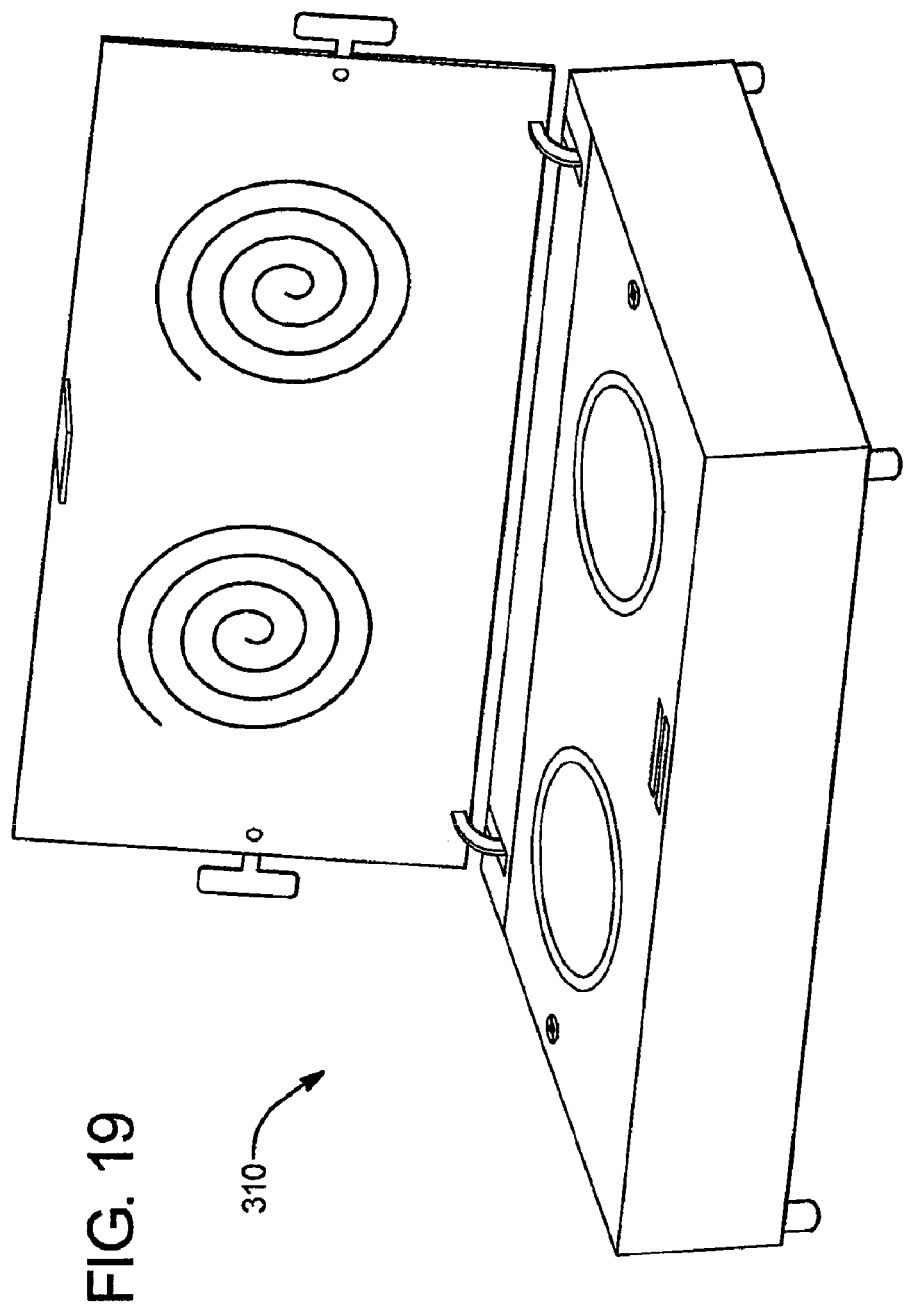
FIG. 19 is another perspective view of one embodiment of a cooking appliance including a plurality of respective upper and lower cooking surfaces

Referring now to FIGS. 18 and 19. Each of the foregoing embodiments disclosed herein include a single respective upper and lower cooking surface. FIG. 18 illustrates a cooking appliance 210 including six respective upper and lower cooking surfaces. A cooking appliance 210 such as that disclosed in FIG. 18 could be used, for example, to cook large quantities of food at once. Although the cooking appliance 210 includes legs, which could be retractable for portability, it should be appreciated that the cooking appliance 210 could simply sit on a preexisting table or flat surface without legs.

FIG. 19 illustrates as cooking appliance 310 which includes two respective upper and lower cooking surfaces. Cooking appliance 310 could similarly be used for event catering or for home use, when one wishes to cook more than one foodstuff at the same time.

It should be appreciated that the cooking appliances 210 and 310 may include any number of upper and lower cooking surfaces and may include any of the features of and function in substantially the same manner as the cooking appliances 10 and 110 of the foregoing embodiments.

In various embodiments, the base 112 includes feet which may or may not be adjustable. Further, the base 112 may define vents (not shown) which allow heat to exit the cooking appliance. In various embodiments, heat transfer may be assisted by a fan (not shown).

Although the embodiments disclosed herein include the upper heating assembly 116 being manually raised and lowered relative to the lower heating assembly 114, it should be appreciated that in various embodiments, the upper heating assembly 116 may be raised and lowered by a variety of devices including, but not limited to: (a) electromagnetic devices; (b) hydraulic devices; (c) DC servo motors; (d) gear/chain mechanisms; (e) air pistons; and (f) any suitable devices.

It should further be appreciated that the cooking appliance 110 may include a memory device storing a plurality of instructions and a processor, wherein the processor is programmed to execute the plurality of instructions to cause the cooking appliance 110 to perform a variety of automated tasks, including each of the motions and functions described herein. Examples of such a processor are disclosed in U.S. Pat. Nos. 5,934,182, 6,549,818 and 6,813,575, both of which are hereby fully incorporated by reference. The cooking appliance 110 may further include various sensors in electronic communication with the processor including: (a) heat sensors; (b) position sensors; (c) light sensors; and (d) any other suitable sensors. In one embodiment, a timer may send a signal to a processor, wherein the processor is programmed to cause the cooking appliance 110 to automatically shutoff after a predetermined amount of time has passed since the cooking appliance 110 was turned on or a designated event has taken place.

In the various embodiments disclosed herein, the cooking appliance is powered by a wall plug. It should be appreciated that in various other embodiments, the cooking appliance could include a battery power supply. In one embodiment, the battery could be rechargeable. In another embodiment, the cooking appliance could include a solar power supply. An example of such a solar power supply is the Sunforce 13 Watt Folding Solar Panel, Model #500384, available at www.northerntool.com, of course subject to being sized to power the subject invention, the specifications of which are hereby incorporated by reference. The cooking appliance 110 could also be connected to a larger solar panel, such as the Sunforce Solar Charging Kit—Solar Module, 125 Watt, also available at www.northerntool.com, the specifications of which are hereby incorporated by reference. A cooking appliance 210, such as that illustrated in FIG. 18, could have a solar panel on top of the upper heating assembly which captures and stores solar energy, which subsequently is converted and powers the heating elements of the cooking appliance. The use of solar power would enable use of such a cooking appliance 210 at large outdoor events in remote areas, absent the need for a battery or generator. The cooking appliance may also be linked to a fuel cell power supply. It should be appreciated that although use of solar power and fuel cells is proposed as a power supply, the cooking appliance may still be successfully powered by a battery or generator.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention is claimed as follows:

1. A cooking appliance comprising:
a first heating assembly having a first cooking surface;
a second heating assembly having a second cooking surface and defining a receiving aperture, the second heating assembly being operatively connected to the first heating assembly, wherein the first heating assembly is translatable relative to the second heating assembly; and
a guide post having a defined length extending from the first heating assembly, wherein the receiving aperture is configured to receive the guide post and sliding of the guide post into the receiving aperture causes the first heating assembly to translate in a substantially linear manner and to be maintained in a substantially parallel relationship relative to the second heating assembly during translation of the first heating assembly from a first operative position to a second operative position in which the first cooking surface is secured to and abuts the second cooking surface and wherein the guide post is configured to enable the first heating assembly to maintain a third operative position in which the first heating assembly is spaced apart from and substantially parallel to the second heating assembly, and wherein the length of the guide post governs a distance between the first heating assembly and the second heating assembly when the first heating assembly is in the third operative position.

2. The cooking appliance of claim 1, wherein the guide post has a shape selected from the group consisting of: (a) substantially rectangular; (b) substantially square; (c) substantially circular; and (d) substantially polygonal.

3. The cooking appliance of claim 1, wherein the second heating assembly defines a plurality of receiving apertures and a plurality of guide posts extend from the first heating assembly.

4. The cooking appliance of claim 3, wherein each of the plurality of receiving apertures is sized to receive one of the plurality of guide posts and each of the plurality of guide posts travel into one of the plurality of receiving apertures during translation of the first heating assembly from the first operative position to the second operative position.

5. The cooking appliance of claim 1, wherein the guide post is located substantially at a front end of the first heating assembly and the receiving aperture is located substantially at the front end of the second heating assembly.

6. The cooking appliance of claim 1, wherein the second heating assembly includes a resting aperture which is configured to receive the guide post and wherein the resting aperture has a first depth which is less than a second depth of the receiving aperture.

7. The cooking appliance of claim 6, wherein a bottom of the guide post abuts a bottom of the resting aperture when the first heating assembly is in the third operative position relative to the second heating assembly.

8. The cooking appliance of claim 1, wherein the guide post is removable from the cooking appliance.

9. The cooking appliance of claim 1, wherein the guide post is configured to be adjusted to various lengths.

10. The cooking appliance of claim 9, wherein the guide post is a telescoping guide post.

11. The cooking appliance of claim 1, wherein the cooking appliance is configured to operate with a plurality of interchangeable guide posts of different sizes.

12. The cooking appliance of claim 1, wherein the guide post is constructed of two different materials.

13. The cooking appliance of claim 12, wherein the two different materials are stainless steel and teflon.

14. The cooking appliance of claim 1, wherein the guide post is comprised of at least two different portions, each of the portions having a different diameter.

15. A cooking appliance comprising:
a first heating assembly having a first cooking surface;
a second heating assembly having a second cooking surface and defining a receiving aperture having a first depth and a resting aperture having a second depth which is less than the first depth, the second heating assembly being operatively connected to the first heating assembly, wherein the first heating assembly is vertically translatable in a substantially linear manner relative to the second heating assembly;

a guide post having a defined length extending from the first heating assembly, wherein the receiving aperture is configured to receive the guide post;

a first operative position of the first heating assembly relative to the second heating assembly, wherein a bottom of the guide post abuts the receiving aperture and the first heating assembly is substantially perpendicular to the second heating assembly;

a second operative position of the first heating assembly relative to the second heating assembly, wherein the bottom of the guide post abuts the resting aperture and the first heating assembly is substantially parallel to and spaced apart from the second heating assembly, wherein the length of the guide post governs a distance between the first heating assembly and the second heating assembly when the first heating assembly is in the second operative position; and a third operative position of the first heating assembly, relative to the second heating assembly, wherein the guide post is substantially located in the receiving aperture and wherein the first heating assembly rests on the second heating assembly, wherein sliding of the guide post into the receiving aperture causes the first heating assembly to translate in a substantially linear manner and to be maintained in a substantially parallel relationship relative to the second heating assembly.

16. The cooking appliance of claim 15, wherein the first heating assembly is operatively connected to the second heating assembly by a hinge assembly.

17. The cooking appliance of claim 16, wherein the hinge assembly includes at least one hinge pin and at least one track.

18. The cooking appliance of claim 17, wherein the track is substantially L-shaped.

19. The cooking appliance of claim 15, wherein the first cooking surface maintains a substantially parallel relationship with the second cooking surface as the first cooking surface translates relative to the second cooking surface.

20. The cooking appliance of claim 15, wherein at least one of the first and second cooking surfaces is removable.

21. The cooking appliance of claim 20, wherein the first cooking surface is interchangeable with a third cooking surface, and the second cooking surface is interchangeable with a fourth cooking surface.

22. A cooking appliance comprising:
a first heating assembly having a first cooking surface;
a second heating assembly having a second cooking surface and defining a receiving aperture, the second heating assembly being operatively connected to the first heating assembly, wherein the first heating assembly is translatable relative to the second heating assembly;
a guide post having a defined length extending from the first heating assembly, wherein the receiving aperture is configured to receive the guide post and the guide post slides into the receiving aperture during translation of the first heating assembly from a first operative position to a second operative position, wherein the sliding of the guide post into the receiving aperture causes the first heating assembly to translate in a substantially linear manner and to be maintained in a substantially parallel relationship relative to the second heating assembly as the first assembly translates from the first operative position to the second operative position in which the first cooking surface is secured to and abuts the second cooking surface and wherein the guide post is configured to enable the first heating assembly to maintain a third operative position in which the first heating assembly is spaced apart from and parallel to the second heating assembly, and wherein a length of the guidepost governs a distance between the first heating assembly and the second heating assembly when the first heating assembly is in the third operative position, and wherein a bottom of the guide post abuts a bottom of a resting aperture when the first heating assembly is in the third operative position relative to the second heating assembly; and
a thermostat assembly configured to control a cooking temperature of the first and second cooking surfaces.

23. The cooking appliance of claim 22, wherein the first heating assembly includes a plurality of first cooking surfaces and the second heating assembly includes a plurality of second cooking surfaces.

24. The cooking appliance of claim 22, which includes a power supply, wherein the power supply is selected from the group consisting of: (a) a battery; (b) a solar power supply; (c) a wall-plug; (d) a generator; and (e) a fuel cell.

* * * * *